US012198667B2

(12) United States Patent
Mok et al.

(10) Patent No.: US 12,198,667 B2
(45) Date of Patent: Jan. 14, 2025

(54) ACOUSTIC ARTICLES AND METHODS THEREOF

(71) Applicant: 3M INNOVATIVE PROPERTIES COMPANY, St. Paul, MN (US)

(72) Inventors: Michelle M. Mok, St. Paul, MN (US); Michael R. Berrigan, Oakdale, MN (US); Nicole D. Petkovich, Little Canada, MN (US); Jonathan H. Alexander, Roseville, MN (US); Michael S. Wendland, North St. Paul, MN (US); Seungkyu Lee, Cupertino, CA (US); Hassan Sahouani, Hastings, MN (US)

(73) Assignee: 3M Innovative Properties Compnay, St. Paul, MN (US)

( * ) Notice: Subject to any disclaimer, the term of this patent is extended or adjusted under 35 U.S.C. 154(b) by 326 days.

(21) Appl. No.: 17/602,649

(22) PCT Filed: Apr. 13, 2020

(86) PCT No.: PCT/IB2020/053471
§ 371 (c)(1),
(2) Date: Oct. 8, 2021

(87) PCT Pub. No.: WO2020/217131
PCT Pub. Date: Oct. 29, 2020

(65) Prior Publication Data

US 2022/0165242 A1 May 26, 2022

Related U.S. Application Data

(60) Provisional application No. 62/838,758, filed on Apr. 25, 2019.

(51) Int. Cl.
*G10K 11/165* (2006.01)
*D06M 11/74* (2006.01)
(Continued)

(52) U.S. Cl.
CPC .......... *G10K 11/165* (2013.01); *D06M 11/74* (2013.01); *D06M 11/77* (2013.01); *D06M 15/01* (2013.01);
(Continued)

(58) Field of Classification Search
CPC ... G10K 11/165; G10K 11/168; G10K 11/172
See application file for complete search history.

(56) References Cited

U.S. PATENT DOCUMENTS 3,971,373 A 7/1976 Braun
5,304,415 A 4/1994 Kurihara
(Continued)

FOREIGN PATENT DOCUMENTS

CN 104562702 A 4/2015
CN 106739288 5/2017
(Continued)

OTHER PUBLICATIONS

Wypych, Handbook of fillers Chapter 5 (Year: 2016).*
(Continued)

*Primary Examiner* — Forrest M Phillips
*Assistant Examiner* — Joseph James Peter Illicete
(74) *Attorney, Agent, or Firm* — Philip P. Soo

(57) ABSTRACT

Provided are acoustic articles, and related methods, that include a porous layer and heterogeneous filler received in the porous layer. The heterogeneous filler can include clay, diatomaceous earth, graphite, glass bubbles, polymeric filler, non-layered silicate, plant-based filler, or a combination thereof, and can have a median particle size of from 1 micrometer to 1000 micrometers and a specific surface area of from 0.1 $m^2/g$ to 800 $m^2/g$. The acoustic article can have an overall flow resistance of from 100 MKS Rayls to 8000
(Continued)

MKS Rayls. The acoustic articles can serve as acoustic absorbers, vibration dampers, and/or acoustic and thermal insulators.

19 Claims, 6 Drawing Sheets

(51) Int. Cl.

| | |
|---|---|
| ***D06M 11/77*** | (2006.01) |
| ***D06M 15/01*** | (2006.01) |
| ***D06M 15/227*** | (2006.01) |
| ***D06M 23/08*** | (2006.01) |
| ***G10K 11/168*** | (2006.01) |

(52) U.S. Cl.

CPC .......... *D06M 15/227* (2013.01); *D06M 23/08* (2013.01); *G10K 11/168* (2013.01)

(56) References Cited

U.S. PATENT DOCUMENTS

| | | | | |
|---|---|---|---|---|
| 5,332,426 | A | 7/1994 | Tang | |
| 5,754,491 | A * | 5/1998 | Cushman | G10K 11/165 367/1 |
| 6,494,974 | B2 * | 12/2002 | Riddell | A61F 13/53 156/181 |
| 6,617,002 | B2 | 9/2003 | Wood | |
| 6,977,109 | B1 | 12/2005 | Wood | |
| 7,279,440 | B2 | 10/2007 | Berrigan | |
| 7,730,994 | B2 | 6/2010 | Meres | |
| 7,731,878 | B2 | 6/2010 | Wood | |
| 7,828,969 | B2 | 11/2010 | Eaton | |
| 7,918,313 | B2 | 4/2011 | Gross | |
| 8,100,226 | B2 | 1/2012 | Cao | |
| 8,631,900 | B2 | 1/2014 | Miyake | |
| 8,906,815 | B2 | 12/2014 | Moore | |
| 9,238,203 | B2 | 1/2016 | Scheibner | |
| 9,422,411 | B2 | 8/2016 | Sahouani | |
| 9,580,848 | B2 | 2/2017 | Henderson | |
| 9,689,096 | B2 | 6/2017 | Berrigan | |
| 9,771,675 | B2 | 9/2017 | Atshuler | |
| 9,805,708 | B2 * | 10/2017 | Kim | B32B 38/12 |
| 10,214,452 | B2 * | 2/2019 | Turcinskas | C04B 28/006 |
| 10,392,798 | B2 * | 8/2019 | Kragness | B32B 37/12 |
| 10,540,952 | B2 * | 1/2020 | Mohammadi Gojani | B32B 9/047 |
| 10,597,326 | B2 * | 3/2020 | Turcinskas | C04B 28/006 |
| 10,603,868 | B2 * | 3/2020 | Lee | D04H 3/018 |
| 10,809,233 | B2 * | 10/2020 | Abraham | B06B 1/0685 |
| 10,858,779 | B2 * | 12/2020 | Ogawa | D06N 3/0065 |
| 11,370,203 | B2 * | 6/2022 | Ogawa | B32B 27/12 |
| 11,535,004 | B2 * | 12/2022 | Murayama | C04B 38/0054 |
| 2005/0104245 | A1 | 5/2005 | Wood | |
| 2008/0038976 | A1 | 2/2008 | Berrigan | |
| 2013/0344279 | A1 | 12/2013 | Doshi | |
| 2015/0034414 | A1 | 2/2015 | Arata | |
| 2016/0298266 | A1 | 10/2016 | Zillig | |
| 2017/0334163 | A1 | 11/2017 | Pape | |
| 2018/0124502 | A1 | 5/2018 | Liu | |
| 2018/0345246 | A1 | 12/2018 | Wendland | |
| 2019/0062991 | A1 * | 2/2019 | Ogawa | B32B 5/24 |

FOREIGN PATENT DOCUMENTS

| | | | |
|---|---|---|---|
| CN | 108004675 | 5/2018 | |
| DE | 10222458 | 12/2003 | |
| JP | 11327565 | 11/1999 | |
| JP | 2001175265 | 6/2001 | |
| JP | 2005338129 | 12/2005 | |
| JP | 6161557 | 7/2017 | |
| KR | 101282377 | 7/2013 | |
| WO | WO2013-169788 | 11/2013 | |
| WO | WO2015-175733 | 11/2015 | |
| WO | WO2015-193671 | 12/2015 | |
| WO | WO2017-106434 | 6/2017 | |
| WO | WO2017-116974 | 7/2017 | |
| WO | WO2018-126085 | 7/2018 | |
| WO | WO2018-234929 | 12/2018 | |
| WO | WO2019-051761 | 3/2019 | |
| WO | WO2019-079695 | 4/2019 | |
| WO | WO 2019/079695 A1 * | 4/2019 | G10K 11/168 |

OTHER PUBLICATIONS

Wikipedia article, nonwoven fabric (Year: 2018).*

Acticarbone, Calgon Carbon Corporation, 2017, 6 pages.

Kim, "Structural damping by the use of fibrous materials", SAE International Technical Paper, 2015, pp. 1-27.

Venegas, "Acoustical properties of double porosity granular materials", The Journal of the Acoustical Society of America, Nov. 2011, vol. 130, No. 5, pp. 2765-2776.

Venegas, "Influence of sorption on sound propagation in granular activated carbon", The Journal of the Acoustical Society of America, Aug. 2016, vol. 140, No. 2, pp. 755-766.

Wente, "Superfine Thermoplastic Fibers", Industrial Engineering Chemistry, vol. 48, No. 8, Aug. 1956, pp. 1342-1346.

Wente, "Manufacture of Superfine Organic Fibers", Report No. 4364 of the Naval Research Laboratories, May 1954, 21 pages.

International Search Report for PCT International Application No. PCT/IB2020/053471, mailed on Jul. 13, 2020, 5 pages.

* cited by examiner

ACOUSTIC ARTICLES AND METHODS THEREOF

CROSS REFERENCE TO RELATED APPLICATIONS

This application is a national stage filing under 35 U.S.C. 371 of PCT/IB2020/053471, filed Apr. 13, 2020, which claims the benefit of U.S. Provisional Patent Application No. 62/838,758, filed Apr. 25, 2019, the disclosures of which are incorporated by reference in its/their entirety herein.

FIELD OF THE INVENTION

Described herein are acoustic articles suitable for use in thermal and acoustic insulation. The provided acoustic articles can be particularly suitable for reducing noise in automotive and aerospace applications.

BACKGROUND

Customer demands for faster, safer, quieter, and more spacious vehicles continue to drive improvements in automotive and aerospace technologies. Using conventional technologies, implementing such improvements tends to increase vehicle weight and therefore reduce fuel economy. Lightweighting solutions are available, and these come with counterbalancing factors such as cost, complexity, and manufacturing challenges. It can be a technical challenge to develop such solutions, because measures taken to reduce weight often degrade performance in other areas.

Acoustics absorbers, used in vehicles to address noise, vibration and harshness, represent an example of where such tradeoffs are apparent. To improve fuel efficiency, automotive and aerospace manufacturers have replaced many heavy steel components with lighter weight materials, such as aluminum and plastic. Yet, as vehicular structures become lighter, noise tends to become increasingly difficult to attenuate because of the mass law. Based on the mass law, the sound insulation of a solid element generally increases by about 5 dB per doubling of mass. Thus, lighter materials are normally disadvantaged compared to heavier materials.

Conventional acoustic absorber materials include felt, foam, fiberglass, and polyester materials. These materials are generally provided at higher thicknesses to be effective at absorbing airborne noise over a wide range of frequencies. This has the effect of making the absorbers bulky, which reduces the cabin space available to vehicle occupants.

SUMMARY

In working toward an improved acoustic solution, it is recognized that noise can come from different sources. Some noise is borne from structural vibrations, which generate sound energy that propagates and transmits to the air, generating airborne noise. Structural vibration is conventionally controlled using damping materials made with heavy, viscous materials. Other kinds of airborne noise, such as from the wind or a vehicle powertrain, might be generated directly. Conventionally, airborne noise is controlled using a soft, pliable material such as a fibrous batting or foam to absorb the sound energy.

Dense, viscous materials have properties that are ideal for acoustic absorbers, but add significant weight to the vehicle. Further, the dimensional requirements for such materials can be significant. The performance of conventional acoustic absorbers can be estimated by comparing the size of the sound wave to the thickness of the absorber. For To be effective in absorbing lower frequencies, these acoustic absorbers often need to have a thickness of at least about 10% of the wavelength of the incoming sound wave.

For some applications, this is a problem because there may be geometric and/or volumetric constraints defined by the spaces where acoustic absorbers are to be installed. These constraints may be encountered, for example, when insulating aerospace or automotive vehicles. To maximize cabin space, it is generally desirable to absorb sound in as thin a construction as possible. Yet because of their long wavelength, low frequency noise tends to transmit easily through thin acoustic absorbers.

Here, it was discovered that certain porous and/or fine organic and inorganic particles demonstrate excellent absorption over a wide range of frequencies and can display synergistic acoustic properties when incorporated into certain porous layers. This behavior has been observed in both polymeric compositions and inorganic compositions such as clay particles, diatomaceous earth, plant-based filler, non-layered silicates, and unexpanded graphite. These porous and/or fine particles can be enmeshed into the interstices of a porous medium to produce a characteristic acoustic absorption profile. Such acoustic profile can be tuned through the combination of the particle characteristics and how it is rendered within the porous medium.

This profile is a product of the particle composition, surface area of the particle, and particle size. Particular combinations of these materials can provide a high level of acoustic absorption over both high and low frequencies in a thin, layered construction.

In a first aspect, an acoustic article is provided. The acoustic article comprises: a porous layer; and heterogeneous filler received in the porous layer, wherein the heterogeneous filler has a median particle size of from 1 micrometer to 100 micrometers and a specific surface area of from 0.1 $m^2/g$ to 100 $m^2/g$, wherein the acoustic article has a flow resistance of from 100 MKS Rayls to 8000 MKS Rayls.

In a second aspect, an acoustic article is provided, comprising: a porous layer; and heterogeneous filler received in the porous layer, wherein the heterogeneous filler has a median particle size of from 100 micrometers to 800 micrometers and a specific surface area of from 100 $m^2/g$ to 800 $m^2/g$, wherein the acoustic article has a flow resistance of from 100 MKS Rayls to 8000 MKS Rayls.

In a third aspect, an acoustic article is provided, comprising: a porous layer; and heterogeneous filler received in the porous layer, wherein the heterogeneous filler has a median particle size of from 100 micrometers to 1000 micrometers and a specific surface area of from 1 $m^2/g$ to 100 $m^2/g$, wherein the acoustic article has a flow resistance of from 100 MKS Rayls to 8000 MKS Rayls.

In a fourth aspect, an acoustic article is provided, comprising: a porous layer; and heterogeneous filler received in the porous layer, wherein the heterogeneous filler comprises diatomaceous earth, plant-based filler, unexpanded graphite, polyolefin foam, or a combination thereof, having a median particle size of from 1 micrometer to 1000 micrometers, and a specific surface area of from 0.1 $m^2/g$ to 800 $m^2/g$, wherein the acoustic article has a flow resistance of from 100 MKS Rayls to 8000 MKS Rayls.

In a fifth aspect, a method of making an acoustic article is provided, comprising: directly forming a non-woven fibrous web; delivering a heterogeneous filler directly into the non-woven fibrous web as it is being formed, the heterogeneous filler comprising diatomaceous earth, plant-based filler, unexpanded graphite, polyolefin foam, or a combination thereof, having a median particle size of from 1 micrometer to 1000 micrometers, and a specific surface area of from 0.1 $m^2/g$ to 800 $m^2/g$, wherein the acoustic article has a flow resistance of from 100 MKS Rayls to 8000 MKS Rayls.

In a sixth aspect, a method of using the acoustic article is provided, comprising disposing the acoustic article proximate to a surface to damp vibrations of the surface.

In a seventh aspect, a method of using the acoustic article is provided, comprising: disposing the acoustic article proximate to an air cavity to absorb sound energy being transmitted through the air cavity.

Figure 1:
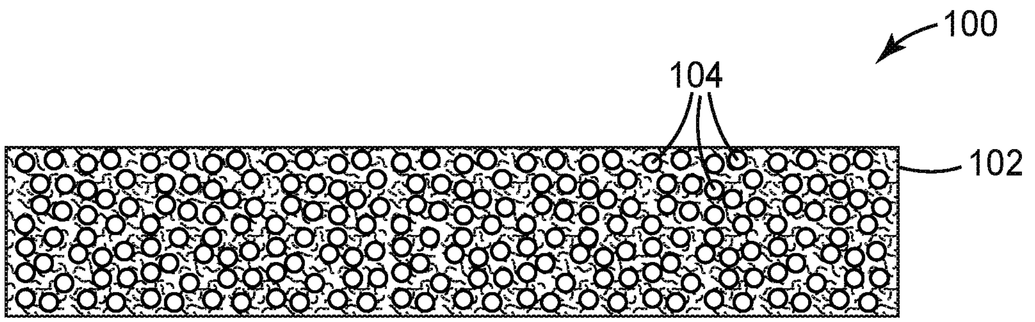
FIGS. 1-13 are side elevational views of single-layered and multilayered acoustic articles according to various embodiments.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DEFINITIONS

As used herein:

"Average" means number average, unless otherwise specified.

"Copolymer" refers to polymers made from repeat units of two or more different polymers and includes random, block and star (e.g. dendritic) copolymers.

"Dimensionally stable" refers to a structure that substantially holds its shape under gravity unassisted (i.e., not floppy).

"Die" means a processing assembly including at least one orifice for use in polymer melt processing and fiber extrusion processes, including but not limited to melt-blowing.

"Discontinuous" when used with respect to a fiber or plurality of fibers means fibers having a limited aspect ratio (e.g., a ratio of length to diameter of e.g., less than 10,000).

"Enmeshed" means that particles are dispersed and physically and/or adhesively held in the fibers of the web.

"Glass transition temperature (or $T_g$)" of a polymer refers to a temperature at which there is a reversible transition in an amorphous polymer (or in an amorphous region within a semi crystalline polymer) from a hard and relatively brittle "glassy" state into a viscous or rubbery state as the temperature is increased.

"Median fiber diameter" of fibers in a non-woven fibrous layer is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Non-woven fibrous layer" means a plurality of fibers characterized by entanglement or point bonding of the fibers to form a sheet or mat exhibiting a structure of individual fibers or filaments which are interlaid, but not in an identifiable manner as in a knitted fabric.

"Oriented" when used with respect to a fiber means that at least portions of the polymer molecules within the fibers are aligned with the longitudinal axis of the fibers, for example, by use of a drawing process or attenuator upon a stream of fibers exiting from a die.

"Particle" refers to a small distinct piece or individual part of a material (i.e., a primary particle) or aggregate thereof in finely divided form. Primary particles can include flakes, powders and fibers, and may clump, physically intermesh, electrostatically associate, or otherwise associate to form aggregates. In certain instances, particles in the form of aggregates of individual particles may be formed as described in U.S. Pat. No. 5,332,426 (Tang et al).

"Polymer" means a relatively high molecular weight material having a molecular weight of at least 10,000 g/mol.

"Porous" means containing holes or voids.

"Shrinkage" means reduction in the dimension of a fibrous non-woven layer after being heated to 150° C. for 7 days based on the test method described in U.S. Patent Publication No. 2016/0298266 (Zillig et al.);

"Size" refers to the longest dimension of a given object or surface.

"Substantially" means a majority of, or mostly, as in an amount of at least 50%, 60, 70, 80, 90, 95, 96, 97, 98, 99, 99.5, 99.9, 99.99, or 99.999/a, or 100%.

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention.

The present disclosure is directed to acoustic articles, assemblies, and methods thereof that function as acoustic absorbers, vibration dampers, and/or acoustic and thermal insulators. The acoustic articles and assemblies generally include one or more porous layers and one or more heterogeneous fillers in contact with the one or more porous layers. Optionally, the provided acoustic articles and assemblies include one or more non-porous barrier layers, resonators, and/or air gaps adjacent to the one or more porous layers. Structural and functional characteristics of each of these components are described in the subsections that follow.

Acoustic Articles

Exemplary acoustic articles are illustrated in FIGS. 1-13 and described below. These acoustic articles can be effective in addressing both noise and undesirable vibrations associated with a structure. In some embodiments, the acoustic article can be disposed on a substrate or placed proximate to an air cavity to absorb sound energy being transmitted through the substrate or air cavity, respectively. In other embodiments, the acoustic article can be placed proximate to a surface to damp vibrations of the surface.

Damping applications include nearfield damping applications. Nearfield damping is a mechanism that dissipates the vibration energy of a structure by controlling both non-propagating and propagating waves that are created near the surface (nearfield region) of the structure by structural vibration. In the nearfield region, oscillatory and incompressible fluid flows parallel to the surface of the structure, with the strength of these flows decreasing gradually with increasing distance from the surface of the vibrating structure. The strength of the energy in this region can be significant, so dissipation of the energy in this region can help attenuate structural vibration.

The nearfield region can be defined as from 30 centimeters to 0 centimeters, from 15 centimeters to 0 centimeters, from 10 centimeters to 0 centimeters, from 8 centimeters to 0 centimeters, from 5 centimeters to 0 centimeters, relative to the surface of a given substrate (or structure). Here, "0 centimeters" is defined as being at the surface of the substrate.

Further particulars concerning nearfield damping are described in Nicholas N. Kim, Seungkyu Lee, J. Stuart Bolton, Sean Hollands and Taewook Yoo, *Structural damping by the use of fibrous materials*, SAE Technical Paper, 2015-01-2239, 2015.

As shown in these figures, useful acoustic articles include both single-layered and multilayered constructions. Unless specifically indicated otherwise, it is to be understood that one or more additional layers or surface treatments may be present on either major surface of a given acoustic article, or between otherwise adjacent layers of the acoustic article.

FIG. 1 shows a single-layered acoustic article hereinafter referred to by the numeral 100. The article 100 includes a porous layer 102 and a plurality of heterogeneous filler 104 dispersed therein. In this embodiment, the heterogeneous filler 104 is dispersed in the porous layer 102 uniformly across its entire thickness as shown.

For the sake of example, the porous layer 102 is depicted here as a fibrous non-woven layer comprised of a plurality of fibers, but other types of porous layers (e.g., open-celled foams, particulate beds) can also be used. Useful porous layers are described in detail in a separate sub-section below, entitled "Porous layers."

Heterogeneous filler 104 having desirable acoustic properties is enmeshed in the plurality of fibers of the porous layer 102. The heterogeneous filler 104 can be present in an amount of from 1% to 99%, 10% to 90%, 15% to 85%, 20% to 80%, or in some embodiments, less than, equal to, or greater than 1%, 2, 3, 4, 5, 7, 10, 12, 15, 20, 25, 30, 35, 40, 45, 50, 55, 60, 65, 70, 75, 80, 85, 90, 95, 97, 98, or 99% by weight relative to the combined weight of the porous layer 102 and heterogeneous filler 104.

Examples of heterogeneous filler that impart acoustical benefits include porous and/or fine fillers such as clay, diatomaceous earth, graphite, glass bubbles, porous polymeric filler, non-layered silicates, plant-based filler, and combinations thereof. A detailed account of these heterogeneous fillers is provided in a later sub-section entitled "Heterogeneous fillers."

The heterogeneous filler 104 in the porous layer 102 can affect the average fiber-to-fiber spacing within the non-woven fibrous structure of the porous layer 102. The extent to which this occurs depends, for example, on the particle size of the heterogeneous filler 104 and the loading of the heterogeneous filler 104 within the porous layer 102. The porous layer 102 can have an average fiber-to-fiber spacing of from 0 micrometers to 1000 micrometers, from 10 micrometers to 500 micrometers, from 20 micrometers to 300 micrometers, or in some embodiments, less than, equal to, or greater than 0 micrometers, 1, 2, 3, 4, 5, 7, 10, 11, 12, 15, 17, 20, 25, 30, 35, 40, 45, 50, 60, 70, 80, 90, 100, 110, 120, 150, 170, 200, 250, 300, 350, 400, 450, 500, 600, 700, 800, 900, or 1000 micrometers.

Conversely, the heterogeneous filler 104 within the acoustic article 100 has an interparticle (i.e., particle-to-particle) spacing that is at least partially dependent on both its loading level as well as the structural nature of the porous layer 102. The heterogeneous filler 104 can have an average interparticle spacing of from 20 micrometers to 4000 micrometers, from 50 micrometers to 2000 micrometers, from 100 micrometers to 1000 micrometers, or in some embodiments, less than, equal to, or greater than 20 micrometers, 25, 30, 35, 40, 45, 50, 60, 70, 80, 90, 100, 110, 120, 150, 170, 200, 250, 300, 350, 400, 450, 500, 600, 700, 800, 900, 1000, 1100, 1200, 1500, 1700, 2000, 2500, 3000, 3500, or 4000 micrometers.

Average fiber-to-fiber spacing, particle-to-fiber, and particle-to-particle spacing can be obtained using X-ray microtomography, a nondestructive 3D imaging technique where the contrast mechanism is the absorption of X-rays by components within the sample under examination. An X-ray source illuminates the sample and a detection system collects projected 2D X-ray images at discrete angular positions as the sample is rotated.

The collection of projected 2D images are taken through the process known as reconstruction to produce a stack of 2D slice images along the axis of sample rotation. The reconstructed 2D slice images can be examined individually, as a series of images, or be used collectively to generate a 3D volume containing the examined sample. Measurements can be made, for example, using a Skyscan 1172 (Bruker microCT, Kontich, Belgium) X-ray microtomography scanner at a suitable resolution (e.g., 1-3 micrometers), and X-ray source settings of 40 kV and 250 μA.

The reconstructed images can then be processed to isolate the location of the particles or particles and fibers within the scanned specimen. A greyscale threshold can allow isolation of the particles from the lower density material in the porous layer and isolation of the particles and fibers from lower density noise in the dataset. Processing can be conducted, for example, CT Analyzer software (v 1.16.4 Bruker microCT, Kontich, Belgium) to obtain average particle-to-particle, particle-to-fiber, and fiber-to-fiber spacings.

The desirable thickness of the porous layer 102 is highly dependent on the application and thus need not be particularly restricted. The porous layer 102 can have an overall thickness of from 1 micrometer to 10 centimeters, from 30 micrometers to 1 centimeter, from 50 micrometers to 5000 millimeters, or in some embodiments, less than, equal to, or greater than, 1 micrometer, 2, 5, 10, 20, 30, 40, 50, 100, 200, 500 micrometers, 1 millimeter, 2, 3, 4, 5, 7, 10, 20, 50, 70, or 100 millimeters.

Advantageously, the combination of the porous layer 102 and heterogeneous filler 104 can significantly enhance acoustical absorption at low sound frequencies, such as sound frequencies of from 50 Hz to 500 Hz while preserving acoustical absorption at higher sound frequencies exceeding 500 Hz.

In some embodiments, the addition of heterogeneous filler can substantially increase acoustical absorption of the acoustic article over sound frequencies of less than, equal to, or greater than 50 Hz, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 400, 500, 700, 1000, 2000, 3000, 4000, 5000, 7000, or 10,000 Hz.

Figure 2:
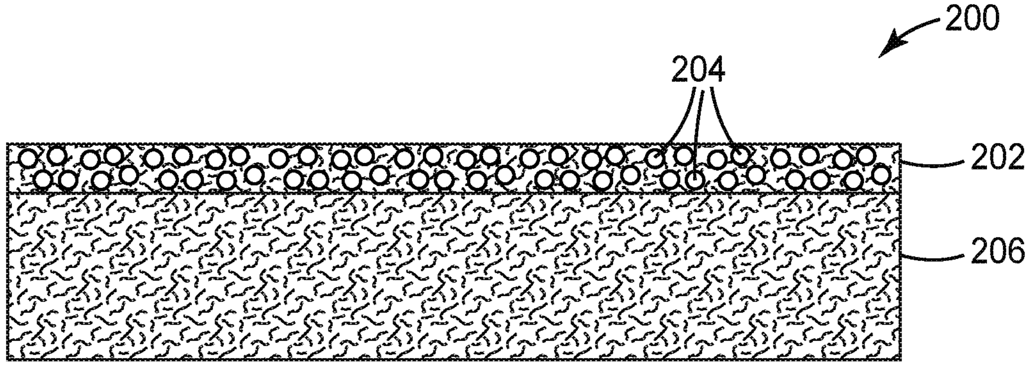

FIG. 2 shows an article 200 according to a dual-layered embodiment comprised of a first porous layer 202 containing heterogeneous filler 204 and a second porous layer 206 that does not contain the heterogeneous filler 204. As shown, the second porous layer 206 extends across and directly contacts the first porous layer 202. The first porous layer 202 can have characteristics similar to those of the porous layer 102 already described with respect to FIG. 1.

Other embodiments are possible. For example, the heterogeneous filler may be only partially enmeshed in the first porous layer, with some heterogeneous filler residing outside of this layer. In another embodiment, essentially none of the heterogeneous filler is enmeshed in the first porous layer, while essentially all of the heterogeneous filler is present in a particulate bed of heterogeneous filler confined between the first and second porous layers, both of which are unfilled.

Referring again to FIG. 2, the second porous layer 206 has a thickness significantly greater than that of the first porous layer 202. Depending on the nature of the noise to be attenuated, it might be advantageous for the first porous layer 202 to have a thickness significantly greater than that of the second porous layer 206. One porous layer may have a thickness that is less than, equal to, or greater than 10%, 20%, 30%, 40%, 50%, 60%, 70%, 80%, 90%, 100%, 110%, 120%, 130%, 140%, 150%, 200%, 250%, 300%, 400%, 500%, 600%, 700%, 800%, 900%, or 1000% of the thickness of the other porous layer.

Figure 3:
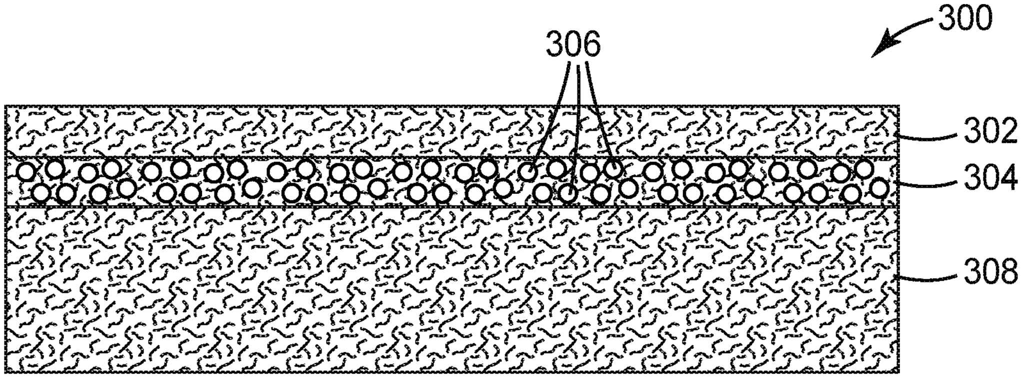

One or more additional layers can be disposed between these layers or extend along the exterior-facing major surfaces of the first and second porous layers 202, 206. An example of such a construction is shown in FIG. 3. FIG. 3 depicts an article 300 having three porous layers, where the first and third porous layers 302, 308 are unfilled and the second porous layer 304 is filled with heterogeneous filler 306 and sandwiched between the former two layers.

In the multilayered constructions (e.g., the articles 200, 300 of FIGS. 2 and 3), the unfilled porous layers can improve the low frequency performance of the overall acoustic article. In order to achieve high acoustic absorption, the acoustic impedance of the article can be close to the characteristic impedance of surrounding fluid. If the surrounding fluid is air, then the characteristics impedance is the product of the density and the speed of sound of the air medium. The porous layers can thus help match the acoustic impedance of the multilayered articles to the characteristic impedance of the surrounding medium.

For normal incidence plane wave situation, the specific acoustic impedance at the surface of the material, $z_{surf}$, with the thickness L can be described as following equation:

$$z_{surf}=p/v|_{x=L}=-jz_c\cot(kx)|_{x=L}$$

where, p is acoustic pressure, v is particle velocity, k is the acoustic wave number, x is the distance from a substrate surface, $z_c$ is the characteristic impedance of the air and they can be obtained from following relationships:

$$k=2\pi f/c$$

$$z_c=(\rho K)^{1/2}$$

where f denotes frequency, c denotes speed of sound of the air, ρ and K are density and bulk modulus of the air, respectively. The highest acoustic absorption occurs when the specific acoustic impedance at the surface becomes zero. Therefore, a sound absorbing material generally follows the quarter wavelength rule, in which a quarter wavelength corresponds to the thickness of the material. This quarter wavelength corresponds to the frequency at which the material displays its first peak absorption.

Decreasing the speed of sound can improve the low frequency performance without increasing the thickness of the material. At the surface where the material is placed against the rigid wall, the surface impedance becomes infinite since particle velocity, v, and x above both approach zero. Based on the above relationship, it is surmised that the heterogeneous filler within a porous layer can help lower the frequency that provides zero acoustic impedance at the surface of material by changing the wavelength within the material and providing a pressure-reducing effect. In some embodiments, the addition of heterogeneous filler can also enable reflections of the sound waves to be reduced within the acoustic article. Reducing pressure also lowers acoustic impedance, enabling some sound to penetrate and helping entrap more sound energy within the overall acoustic article, thereby improving dissipation of noise and thus barrier performance.

In the above embodiments, the heterogeneous filler is substantially decoupled from each other and any porous layers; that is, the particles of the heterogeneous filler are not physically attached to each other and capable of at least limited movement or oscillation independently from the surrounding structure. In these instances, the enmeshed particles can move and vibrate within the fibers of the non-woven material largely independently of the fibers themselves.

Alternatively, at least some of the heterogeneous filler could be physically bonded to the porous layers in which it is disposed. In some embodiments, these physical bonds are created by incorporating binders (e.g., binder fibers) within the porous layer, which can become tacky and adhere to the filler particles upon application of heat. To preserve the acoustic properties of the heterogeneous filler, it is generally preferable that the binder does not significantly flow into the pores of the filler particles.

It is to be understood that further embodiments are also possible in which the acoustic article is comprised of four, five, six, seven, or even more porous layers, where at least one porous layer contains, or is otherwise in contact with, the heterogeneous filler.

Figure 4:
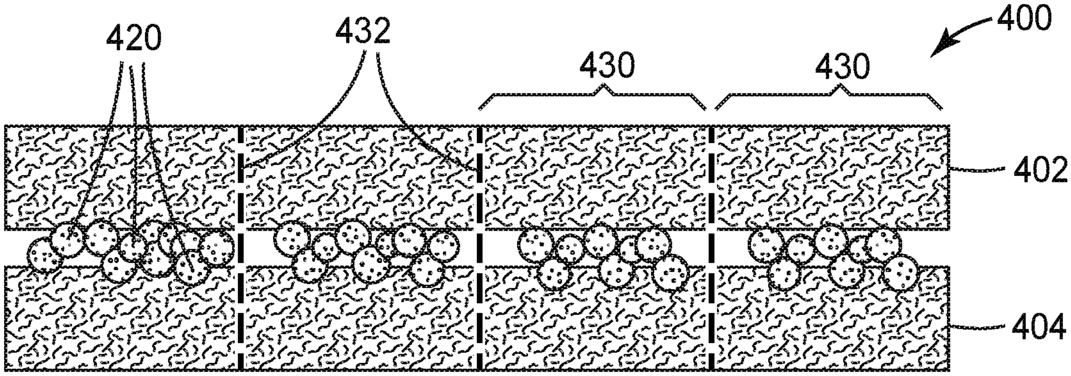

FIG. 4 shows a side view of another acoustic article 400 that has first and second porous layers 402, 404 and a layer of heterogeneous filler 420 disposed between the porous layers 402, 404. The porous layers 402, 404 and heterogeneous filler 420 are analogous to the porous layers described with respect to FIGS. 1-3. In this embodiment, the porous layers 402, 404 can not only contribute to acoustic performance of the article 400 but also serve to physically confine and secure the heterogeneous filler 420 to the space between the porous layers 402, 404.

In this embodiment, the heterogeneous filler 420 is not enmeshed in the porous layers 402, 404 but rather formed into a particulate bed. The article 400 is also divided into a plurality of sectioned chambers 430 by walls 432 to provide a quilted structure. The chambers 430 are located in transverse directions relative to each other, with each chamber 430 containing the first porous layer 402, layer of heterogeneous filler 420, and second porous layer 404 as shown. Optionally, the chambers 430 can have two-dimensional grid configuration in plan view.

The walls 432 separating the chambers 430 from each other need not be restricted in composition and may or may not be porous. In preferred embodiments, the walls 432 are made from a flexible polymeric membrane having a low flow resistance, a scrim, or a perforated film. Advantageously, the walls 432 provide improved securement of the heterogeneous filler 420 in the acoustic article 400 and can also improve acoustic performance by providing grazing wave dissipation based on the presence of the lateral boundaries within the article 400.

Further aspects of the article 400 are described in co-pending International Patent Application No. PCT/US18/56671 (Lee et al.), filed on Oct. 19, 2018.

Figure 5:
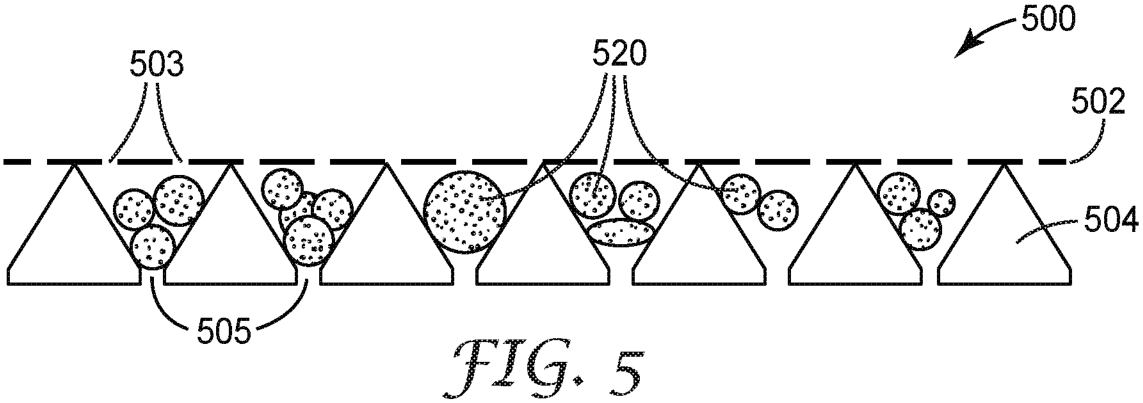

FIG. 5 shows an acoustic article 500 that uses a perforated film as a porous layer. The acoustic article 500 includes heterogeneous filler 520 confined between first and second perforated films 502, 504. The films 502, 504 have a plurality of apertures 503, 505 (or through holes) extending through the respective perforated films 502, 504 along directions perpendicular to the major surfaces of the article 500. Optionally, and as shown, the plurality of apertures 503, 505 are disposed in a two-dimensional pattern having a regular center-to-center spacing between neighboring apertures.

In the illustrated embodiment, the film 504 is significantly thicker than film 502. Further, the apertures 503 are generally cylindrical while the apertures 505 have tapered side walls to produce openings that have a generally conical shape. As shown in FIG. 5, the heterogeneous filler 520 resides within the generally conical openings, and is securely retained between the films 502, 504 because the particles of the heterogeneous filler 520 are significantly larger than the narrowest width of the apertures 503, 505. In an alternative embodiment, the heterogeneous filler may be captured between a pair of symmetrically disposed perforated films.

The films 502, 504 can be coupled to each other by any known method. They can be attached using adhesives, thermal lamination, and/or mechanical couplings. Either of films 502, 504 can also be coupled to a fibrous non-woven layer as previously described using any of these methods. In some embodiments, the fibrous non-woven layer contains tacky polymeric fibers that assist in its attachment to heterogeneous filler, perforated film or another fibrous non-woven layer. Suitable tacky fibers include adhesive fibers made from, for example, styrene-isoprene-styrene or polyethylene/polypropylene copolymers.

In another embodiment, an acoustic article could be provided in which one of the films 502, 504 is eliminated.

In yet another embodiment, the perforated film 502 can be replaced with another porous layer, such as a resistive scrim. Resistive scrims are thin porous layers that display high flow resistance (e.g., up to 2000 MKS Rayls). In some embodiments, resistive scrims are non-woven fibrous webs with a thickness of less than 5000 micrometers and have negligible flexural stiffness.

Inclusion of a resistive layer, such as a resistive scrim, can provide further enhancement of acoustic performance, particularly at lower frequencies. A resistive layer can have a flow resistance of from 10 MKS Rayls to 8000 MKS Rayls, 20 MKS Rayls to 3000 MKS Rayls, or 50 MKS Rayls to 1000 MKS Rayls. In some embodiments, the flow resistance through the resistive layer is less than, equal to, or greater than 10 MKS Rayls, 20, 30, 40, 50, 70, 100, 200, 300, 400, 500, 600, 700, 1000, 1100, 1200, 1500, 1700, 2000, 2500, 3000, 3500, 4000, 4500, 5000, 5500, 6000, 6500, 7000, 7500, or 8000 MKS Rayls.

The resistive layer can have a thickness of from 1 micrometer to 10 centimeters, from 30 micrometers to 1 centimeters, from 50 micrometers to 5000 micrometers, or in some embodiments, less than, equal to, or greater than 10 micrometers, 20, 30, 40, 50, 70, 100, 200, 500, 1 millimeter, 2, 5, 10, 20, 30, 40, 50, 60, 70, 80, 90, or 100 millimeters (10 centimeters).

Figure 6:
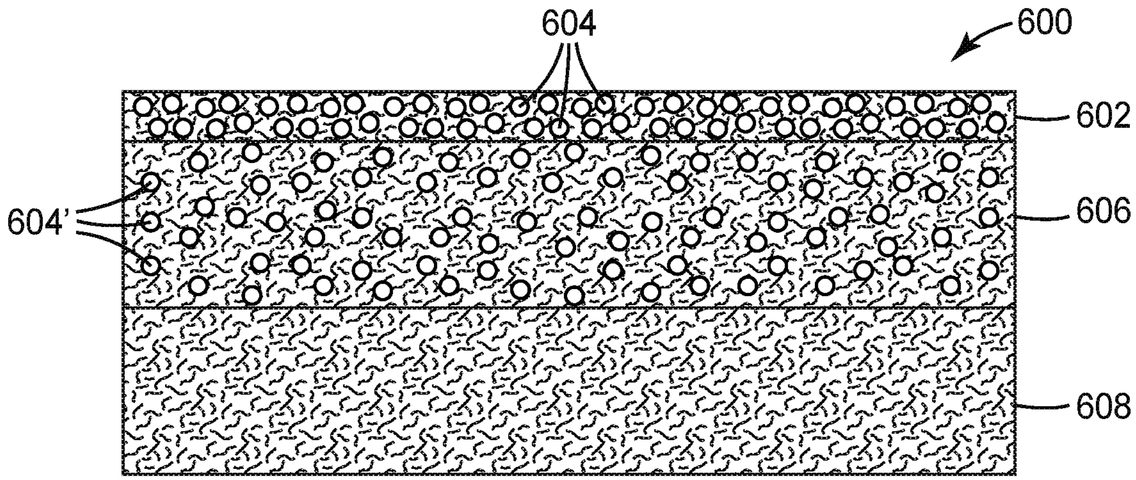

FIG. 6 shows an acoustic article 600 in which porous layers have disparate loadings of heterogeneous filler. In this construction, the article 600 has a first porous layer 602 with a high relative loading of heterogeneous filler 604, a second porous layer 606 having a low relative loading of heterogeneous filler 604', and a third porous layer 608 devoid of any heterogeneous filler. The heterogeneous fillers 604, 604' may or may not have the same composition. The heterogeneous fillers 604, 604' may or may not have the same median particle size. Likewise, the porous layers 602, 606, 608 are intended here to be generic and thus may or may not have the same composition and structure.

If the heterogeneous fillers 604, 604' have the same composition and particle size, the article 600 has discrete layers that progressively decrease in density from the top of the article 600 to the bottom of the article 600 as shown in FIG. 6. Advantages of this construction include design freedom and customization, reduced costs, and tunability, enabling acoustic absorption to be enhanced over certain frequencies as needed.

Figure 7:
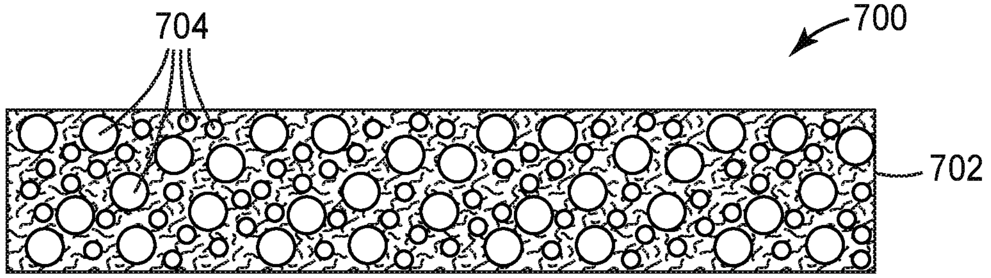

FIG. 7 shows an acoustic article 700 in which a monolithic porous layer 702 contains heterogeneous filler 704 of two distinct particle sizes. The heterogeneous filler 704 may have a bimodal distribution of particle sizes, as shown here, or some other multimodal distribution. Alternatively, the heterogeneous filler 704 may have a distribution that is monomodal but broad. By mixing together heterogeneous fillers having different particle sizes, it is possible to increase total filler loading because the smaller particles can occupy the interstices formed by the larger particles.

Figure 8:
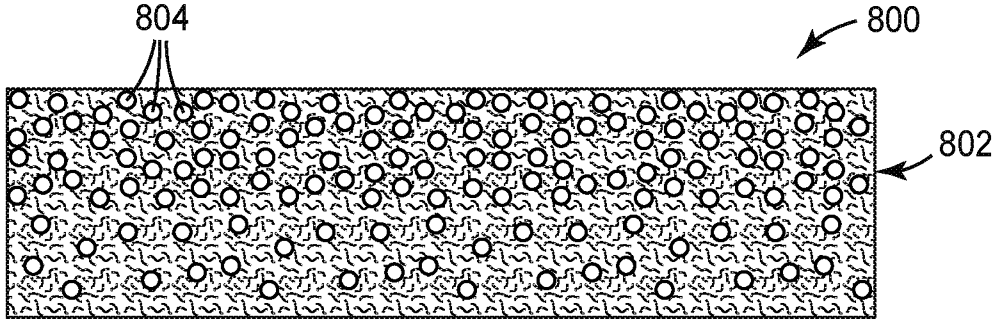

FIG. 8 shows an acoustic article 800 that uses a porous layer 802 containing a density gradient of heterogeneous filler 804. As shown, the density is greatest approaching its top major surface and lowest approaching its bottom major surface.

Figure 9:
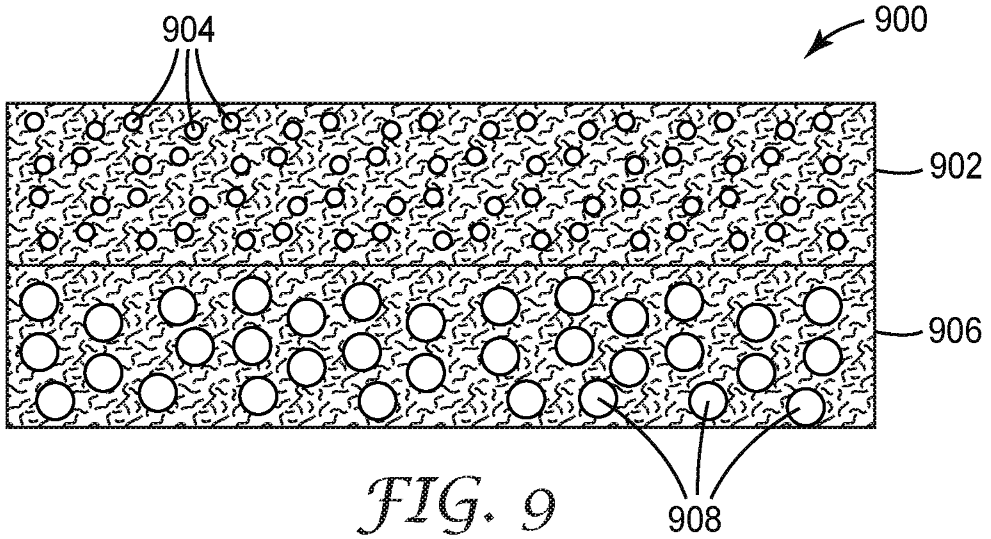

FIG. 9 shows an acoustic article 900 with a bilayer construction, comprised of a first porous layer 902 containing a plurality of a first heterogeneous filler 904 and a second porous layer 906 containing a plurality of a second heterogeneous filler 908. The porous layers 902, 906 flatly contact each other and may be made from the same or different materials. The heterogeneous filler 908 has a median particle size larger than that of the heterogeneous filler 904, as shown.

Figure 10:
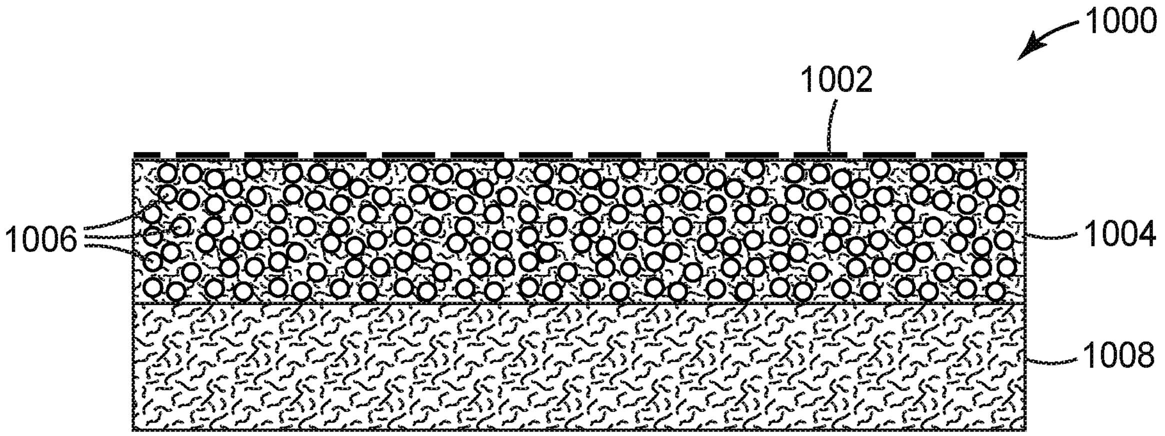

FIGS. 10-13 illustrate further variations and combinations of the acoustic layers previously presented. FIG. 10, for example, shows an acoustic article 1000 in which a first porous layer 1002 is a perforated film disposed on a second porous layer 1004 comprised of a non-woven fibrous web that contains a plurality of heterogeneous filler 1006. The layers 1002, 1004 are backed by a third porous layer 1008 that is unfilled and also made from a non-woven fibrous web. As indicated above, these constructions allow the acoustic behavior of the overall acoustic article to be tuned to a particular application. Such acoustic behavior may include a combination of reflection, absorption, and noise cancellation.

Figure 11:
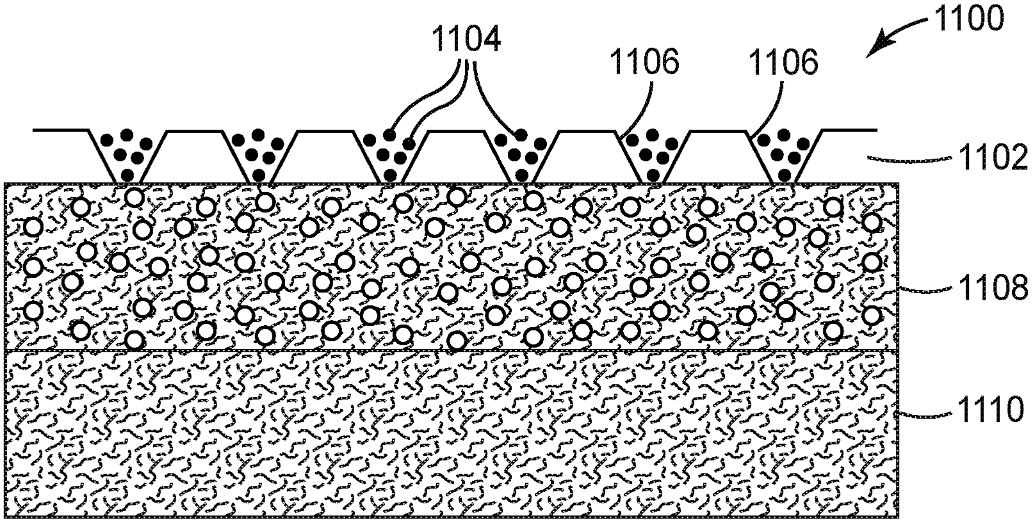

FIG. 11 shows an acoustic article 1100 bearing some similarities to the article 1000 but including a first porous layer 1102 that is a particle-filled perforated film. The perforated film contains a plurality of perforations 1106, as shown, which contain heterogeneous filler 1104. The second and third porous layers 1108, 1110 that are underlying the first porous layer 1102 are generally analogous to those described with respect to the article 1000 in FIG. 10.

Figure 12:
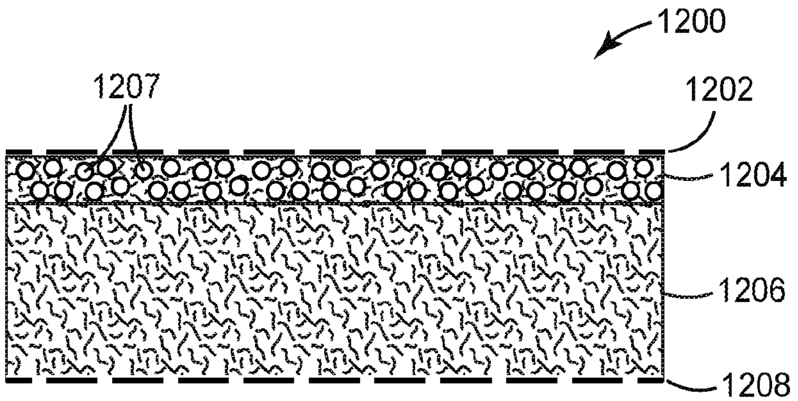

FIG. 12 shows an acoustic article 1200 also similar to article 1000 in FIG. 10 except it includes a fourth porous layer 1208 extending across the first, second, and third porous layers 1202, 1204, 1206, where heterogeneous filler 1207 is enmeshed in the second porous layer 1204. The fourth porous layer 1208 is a perforated film that does not contain or directly contact the heterogeneous filler 1207.

Figure 13:
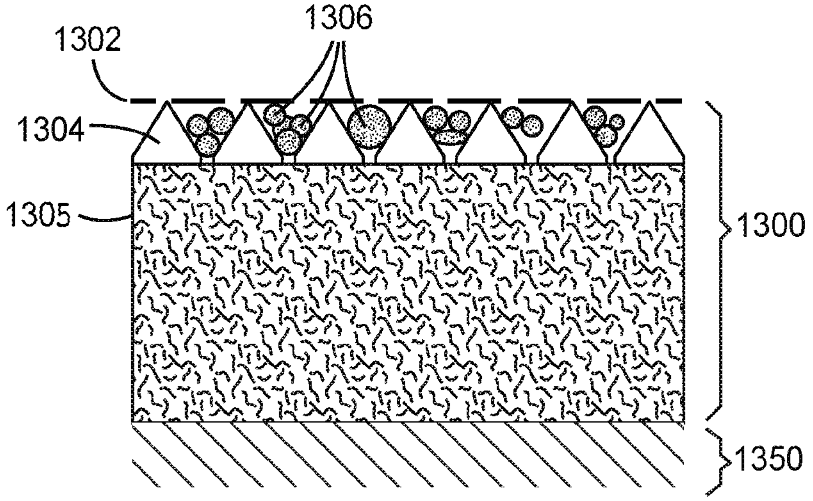

FIG. 13 shows an acoustic article 1300 coupled to a substrate 1350. The acoustic article 1300 has first and second porous layers 1302, 1304 somewhat analogous to those of the acoustic article 500 in FIG. 5. Heterogeneous filler 1306 resides within the second porous layer 1304 and is mechanically retained within the perforations of the second porous layer 1304 by the first porous layer 1302. Extending across and directly contacting the second porous layer 1304 is a third porous layer 1305 comprised of a non-woven fibrous web, which is in turn bonded to the substrate 1350.

Substrates include structural components, such as components of an automobile or airplane and architectural substrates. Structural examples include molded panels (e.g., door panels), aircraft frames, in-wall insulation, and integral ductwork. Substrates can also include components next to these structural examples, such as carpets, trunk liners, fender liners, front of dash, floor systems, wall panels, and duct insulation. In some cases, a substrate can be spaced apart from the acoustic article, as might be the case with hood liners, headliners, aircraft panels, drapes, and ceiling tiles. Further applications for these materials include filtration media, surgical drapes, and wipes, liquid and gas filters, garments, blankets, furniture, transportation (e.g., for aircraft, rotorcraft, trains, and automotive vehicles), electronic equipment (e.g. for televisions, computers, servers, data storage devices, and power supplies), air handling systems, upholstery, and personal protection equipment.

In the aforementioned acoustic articles, the solidity of a given layer depends on the extent to which heterogeneous filler is loaded within that layer. Solidity may increase if heterogeneous filler particles occupy spaces that would have otherwise remained as voids in the porous layer. Solidity may also decrease, however, if inclusion of the heterogeneous filler opens up the structure of the porous layer, creating voids that otherwise would not have existed.

As used herein, solidity is a property inversely related to density and is characteristic of web permeability and porosity (a formula for solidity in provided in the Examples). A low solidity corresponds to high permeability and high porosity. The provided porous layers, when filled with heterogeneous filler, can have a solidity of from 5 percent to 40 percent, from 8 percent to 35 percent, from 10 percent to 30 percent, or in some embodiments, less than, equal to, or greater than 5 percent, 6, 7, 8, 9, 10, 11, 12, 15, 17, 20, 22, 25, 27, 30, 32, 25, 37, 40, 45, 50, 55, 60, 65, 70, 75, 80, 85, 90, or 95 percent. The provided porous layers, in their unfilled form, can have a solidity of less than, equal to, or greater than 5 percent, 6, 7, 8, 9, 10, 11, 12, 15, 17, 20, 22, 25, 27, 30, 32, 25, 37, 40, 45, 50, 55, 60, 65, 70, 75, 80, 85, 90, or 95 percent.

Any of the aforementioned acoustic articles may further include one or more enclosed air gaps between adjacent layers. Air gaps can act as resonant chambers to enhance transmission loss through an acoustic article at particular frequencies. The air gap can act as an acoustic resonator based on quarter wavelength theory. According to this theory, the peak acoustic absorption occurs at a frequency representing the quarter wavelength of the thickness of the acoustic layer. Larger air gaps shift the peak acoustic absorption to lower frequencies. For example, a 5-centimeter thick air gap may have a peak absorption at 1600 Hz, while a 10 cm air gap may produce a peak absorption occurring at 800 Hz.

The air gap can have any thickness that allows it to function as an acoustic resonator. Typically, depending on the acoustic frequency of interest, the air gap can have a thickness of from 10 micrometers to 10 centimeters, from 500 micrometers to 5 centimeters, from 1 millimeter to 3 centimeters, or in some embodiments, less than, equal to, or greater than 10 micrometers, 20, 30, 40, 50, 70, 100, 200, 500, 1 millimeter, 2, 5, 10, 20, 30, 40, 50, 60, 70, 80, 90, or 100 millimeters (10 centimeters).

The provided acoustic articles can also include a layer that contains a plurality of Helmholtz resonators in contact with the porous layer. This layer can be disposed on either major surface of the acoustic article or disposed between otherwise adjacent layers within the acoustic article.

A Helmholtz resonator is essentially a tiny container filled with air, where the container has an open port. The volume of air within the container has a springiness that allows it to vibrate and dissipate sound energy at a certain frequency, or range of frequencies. The Helmholtz resonators can be disposed in a two-dimensional array extending along a major surface of the acoustic article. While not intended to be limiting, examples of suitable Helmholtz resonators include, for example, those described in International Publication No. WO2013169788 (Castiglione et al.).

A composite acoustic article that includes Helmholtz resonators can have a relatively low density of heterogeneous filler. For example, less than 50% of the total void volume can be taken up by the heterogeneous filler. The heterogeneous filler particles can have a non-uniform orientation and/or be irregularly shaped. For example, an asymmetric elongated particle may reside within a pore with its small end down, large end down, or in a transverse orientation. Each orientation produces its own characteristic absorption. Because the provided acoustic articles contain a multiplicity of different particle orientations within the porous layer, these articles can absorb over a wider frequency range than Helmholtz resonators alone.

Figure 14:
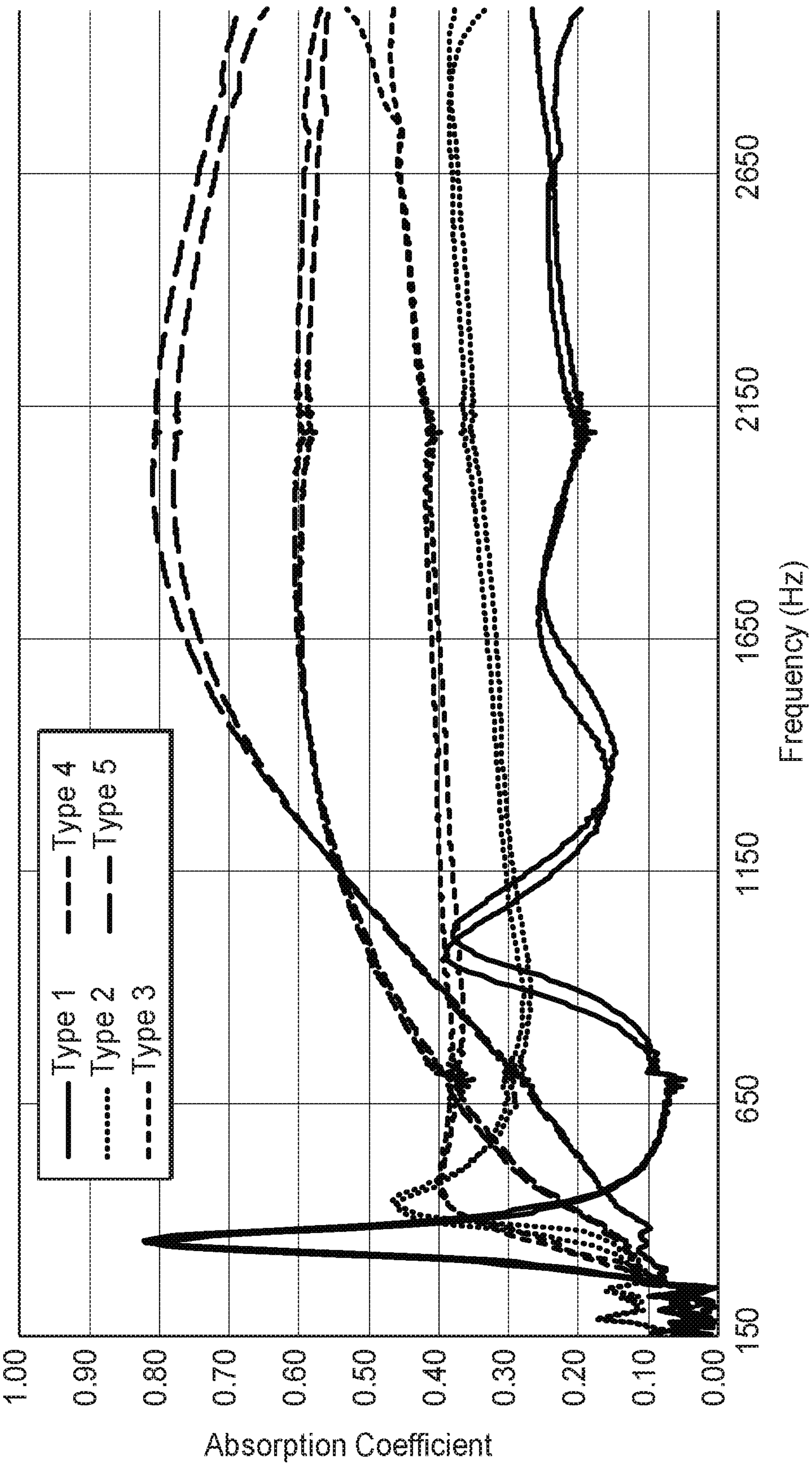
FIG. 14 is a plot showing absorption coefficient as a function of frequency for various acoustic article embodiments.

FIG. 14 exemplifies the wide spectrum of acoustic behaviors that can be obtained by varying the particle size of the heterogeneous filler. Shown here are five different acoustic articles, designated as Types 1-5, in particulate bed configurations. It is to be understood that analogous acoustic behaviors can be obtained by disposing the same, or similar, heterogeneous fillers in other porous layers, including non-woven fibrous layers and foams.

In this figure, absorption coefficient is plotted as a function of frequency as measured for the heterogeneous fillers provided below:

Type 1: Porous poly(divinylbenzene-maleic anhydride), <250 micrometers diameter

Type 2: Silica gel, 150-250 micrometers diameter

Type 3: Porous poly(divinylbenzene-maleic anhydride), 250-420 micrometers diameter Type 4: Porous poly(divinylbenzene-maleic anhydride), 420-595 micrometers diameter Type 5: Porous poly(divinylbenzene-maleic anhydride), >595 micrometers diameter Porous Layers The provided acoustic articles include one or more porous layers. Useful porous layers include, but are not limited to, non-woven fibrous layers, perforated films, particulate beds, and open-celled structures such as open-celled foams, fiberglass, nets, woven fabrics, and combinations thereof. Porous layers are generally permeable, enabling air or some other fluid to freely communicate between opposite sides of the layer. Such layers may also be semi-permeable (permeable along some but not all of the thickness dimension) or impermeable.

Certain non-woven fibrous layers can be effective sound absorbers even without inclusion of heterogeneous filler. For example, non-woven materials that contain a plurality of fine fibers can be very effective at attenuating high sound frequencies. In this frequency regime, the surface area of the structure can promote viscous dissipation of noise, a process whereby sound energy is converted into heat.

Non-woven layers can be made from a wide variety of materials, including organic and inorganic materials. One inorganic fibrous non-woven material is fiberglass. Fiberglass is generally made by melting silica and other minerals in a furnace and then extruding them through spinnerets that contain tiny orifices to produce streams of molten glass. Guided by the flow of hot air, these streams are cooled into fibers and deposited onto a conveyor belt, where the fibers are interlaced with each other to obtain a non-woven fiberglass layer.

Polymeric non-woven layers can be made using a melt blowing process. Melt blown non-woven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown non-woven fibrous layer. Depending on the operating parameters chosen, the collected fibers may be semi-continuous or essentially discontinuous.

Polymeric non-woven layers can also be made by a process known as melt spinning. In melt spinning, the non-woven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins such as polypropylene and polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, and copolymers and blends thereof.

Non-woven fibers can be made from a thermoplastic semi-crystalline polymer, such as a semi-crystalline polyester. Useful polyesters include aliphatic polyesters. Non-woven materials based on aliphatic polyester fibers can be especially advantageous in resisting degradation or shrinkage at high temperature applications. This property can be achieved by making the non-woven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in U.S. Patent Publication No. 2016/0298266 (Zillig et al.).

Molecular weights for useful aliphatic polyesters need not be particularly restricted and can be in the range of from 15,000 g/mol to 6,000,000 g/mol, from 20,000 g/mol to 2,000,000 g/mol, from 40,000 g/mol to 1,000,000 g/mol, or in some embodiments, less than, equal to, or greater than 15,000 g/mol; 20,000; 25,000; 30,000; 35,000; 40,000; 45,000; 50,000; 60,000; 70,000; 80,000; 90,000; 100,000; 200,000; 500,000; 700,000; 1,000,000; 2,000,000; 3,000,000; 4,000,000; 5,000,000; or 6,000,000 g/mol.

The fibers of the non-woven fibrous layer can have any suitable diameter. The fibers can have a median fiber diameter of from 0.1 micrometers to 10 micrometers, from 0.3 micrometers to 6 micrometers, from 0.3 micrometers to 3 micrometers, or in some embodiments, less than, equal to, or greater than 0.1 micrometers, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 25, 27, 30, 32, 35, 37, 40, 42, 45, 47, 50, 53, 55, 57, or 60 micrometers.

Optionally, at least some of the plurality of fibers in the non-woven fibrous layer are physically bonded to each other or to the heterogeneous filler. In general, this has the effect of increasing stiffness and/or strength to the acoustic article, which may be desirable in certain applications. Conventional bonding techniques include use of heat and pressure applied in a point-bonding process or by passing the non-woven fibrous layer through smooth calendar rolls. Such processes can cause deformation of fibers or compaction of the web, however, which may or may not be desirable.

As another option, attachment between fibers or between fiber and the heterogeneous filler may be achieved by incorporating a binder into the non-woven fibrous layer. In some embodiments, the binder is provided by a liquid or a solid powder. In some embodiments, the binder provided by staple binder fibers, which may be injected into the polymer stream during a melt blowing process. Binder fibers have a melting temperature significantly less than that of remaining structural fibers, and act to secure the fibers to each other.

Other methods for bonding fibers to each other are taught in, for example, U.S. Patent Publication No. 2008/0038976 (Berrigan et al.) and U.S. Pat. No. 7,279,440 (Berrigan et al.). In one technique, a collected web of fibers is exposed to a controlled heating and quenching operation that includes forcefully passing through the web a gaseous stream heated to a temperature sufficient to soften the fibers sufficiently to cause the fibers to bond together at points of fiber intersection, where the heated stream is applied for a time period too short to wholly melt the fibers, and then immediately forcefully passing through the web a gaseous stream at a temperature at least 50° C. less than the heated stream to quench the fibers.

In some embodiments, the fiber polymers have high glass transition temperatures, which can be preferred when the acoustic article is to be used in high temperature environments. Certain non-woven fibrous layers shrink significantly when heated to even moderate temperatures in subsequent processing or use, such as when used as a thermal insulation material. Such shrinkage can be problematic for some applications when the melt-blown fibers include thermoplastic polyesters or copolymers thereof, and particularly those that are semi-crystalline in nature.

In some embodiments, the provided non-woven fibrous layers have at least one densified layer adjacent to a layer that is not densified. Either or both of the densified and non-densified layers may be loaded with heterogeneous filler. A densified layer can provide a number of potential benefits. If sufficiently dense, such a layer can be disposed on the outermost surface of the acoustic article and act as a barrier to prevent particles of heterogeneous filler from escaping from the acoustic article. Densification of the non-woven layer can also enhance structural integrity, provide dimensional stability, and enable the non-woven layer to be molded into a three-dimensional shape. Advantageously, a molded acoustic article can assume a customized shape that fully utilizes the space in which it is disposed.

In some embodiments, the densified layer and adjacent non-densified layer are prepared from a monolithic non-woven fibrous layer initially having a uniform density, which is then subjected to heat and/or pressure to create a densified layer on its outermost surface. Methods of producing a densified layer on a non-woven fibrous web, along with further options and advantages, are described in co-pending International Patent Application No. PCT/CN2017/101857 (You et al.).

In some embodiments, the densified layer has a uniform distribution of polymeric fibers throughout the layer. Alternatively, the distribution of polymeric fibers can be varied across a major surface of the non-woven fibrous layer. Such a construction may be appropriate where, for example, the acoustic response is to be dependent on its location along the major surface.

The median fiber diameters of the densified and non-densified portions of the non-woven fibrous layer can be substantially preserved. The processes described above are generally capable of fusing the fibers to each other in the densified region without significant melting of the fibers. In most instances, it is preferable to avoid melting the fibers to retain the acoustic benefit that derives from the surface area within the densified layer of the non-woven fibrous layer.

Other non-woven fibrous layers that may be used in the acoustic article include recycled textile fibers, sometimes referred to as shoddy. Recycled textile fibers can be formed into a non-woven structure using an air laid process, in which a wall of air blows fibers onto a perforated collection drum having negative pressure inside the drum. The air is pulled though the drum and the fibers are collected on the outside of the drum where they are removed as a web. Because of the air turbulence, the fibers are not in any ordered orientation and thus can display strength properties that are relatively uniform in all directions.

One or more additional fiber populations can be incorporated into the non-woven fibrous layer. Differences between fiber populations can be based on, for example, composition, median fiber diameter, and/or median fiber length.

For example, a non-woven fibrous layer can include a plurality of first fibers having a median diameter of up to 10 micrometers and a plurality of second fibers having a median diameter of at least 10 micrometers. For various reasons, it can be advantageous to have fibers of different diameters. Inclusion of the thicker second fibers can improve the resiliency of the non-woven fibrous layer, crush resistance, and help preserve the overall loft of the web. The second fibers can be made from any of the polymeric materials previously described with respect to the first fibers and may be made from a melt blown or melt spun process.

In some embodiments, the second fibers are staple fibers that are interspersed with the first plurality of the fibers. These staple fibers can be provided as crimped fibers to improve the overall loftiness of the fibrous web. The staple fibers can include binder fibers, which can be made from any of the above-mentioned polymeric fibers. Structural fibers can include, but are not limited to, any of the above-mentioned polymeric fibers, as well as inorganic fibers such as ceramic fibers, glass fibers, and metal fibers; and organic fibers such as cellulosic fibers.

The first and second fibers can independently have any of the compositions, structures, and properties previously described with respect to the non-woven fibrous layers containing only a single fiber population. Additional features and benefits relating to combinations of the first and second fibers are described in U.S. Pat. No. 8,906,815 (Moore et al.).

Non-woven fibrous layers can provide numerous technical advantages, at least some of which are unexpected. One advantage derives from the surface area of the non-woven fibrous layer. Retention of surface area provided by the fibers, in combination with heterogeneous filler having a high surface area, enables even a relatively small weight (or thickness) of acoustic material to provide a high level of performance as an acoustic absorber.

These non-woven materials can also be manufactured from fiber materials that can tolerate high temperatures where conventional insulation materials would thermally degrade or fail. This is suitable for insulation materials in automotive and aerospace vehicle applications, which commonly operate in environments that are not only noisy but can reach extreme temperatures. These materials can be highly resilient, enabling them to be compressed and spring back to fill available space within a given cavity. Finally, as described above, these non-woven fibrous layers can also be shaped if so desired to fit a substrate or cavity within a given application, thereby facilitating installation by an operator.

In some embodiments, the porous layer is comprised of a perforated film. Perforated films are comprised of a solid layer having a multiplicity of perforations, or through-holes, extending through the solid layer. The perforations allow fluid communication between air spaces on opposing sides of the wall. Microperforated films are perforated films having apertures whose diameters are on the order of micrometers. These perforated films are generally made from polymeric materials, but can also be made from other materials, including metals.

Like the non-woven fibrous layers, perforated films can have configurations that enable them to absorb sound. Conceptually, plugs of air reside within the perforations and act as mass components within a resonant system. These mass components vibrate within the perforations and dissipate sound energy from friction between the plugs of air and the walls of the perforations. If the perforated film is disposed next to an air cavity, dissipation of sound energy may also occur through destructive interference at the entrance of the perforations from sound waves that are reflected back towards the perforations from the opposite direction. Absorption of sound energy occurs with essentially zero net flow of fluid through the acoustic article.

The perforations can have dimensions (e.g. perforation diameter, shape and length) suitable to obtain a desired acoustic performance over a given frequency range. Acoustic performance can be measured, for example, by reflecting sound off of the perforated film and characterizing the decrease in acoustic intensity as compared to the result from a control sample.

In the figures, the perforations are disposed along the entire surface of the perforated film. Alternatively, the wall could be only partially perforated—that is, perforated in some areas but not others.

Compared to other porous layers, perforated films can be made relatively thin while retaining their acoustic absorption properties. Perforated films can have an overall thickness of from 1 micrometer to 2 millimeters, from 30 micrometers to 1.5 millimeters, from 50 micrometers to 1 millimeter, or in some embodiments, less than, equal to, or greater than, 1 micrometer, 2, 5, 10, 20, 30, 40, 50, 100, 200, 500, 700 micrometers, 1 millimeter, 1.1, 1.2, 1.5, 1.7, or 2 millimeters. In embodiments where thickness is not a constraint, a perforated slab is used instead of a perforated film, where the perforated slab has a thickness of up to 3 millimeters, 5, 10, 30, 50, 100, or even 200 millimeters.

The perforations can have a wide range of shapes and sizes and may be produced by any of a variety of molding, cutting or punching operations. The cross-section of the perforations can be, for example, circular, square, or hexagonal. In some embodiments, the perforations are comprised of an array of elongated slits.

While the perforations may have diameters that are uniform along their length, it is possible to use perforations that have the shape of a conical frustum, truncated pyramid, or otherwise have side walls tapered along at least some of their length, as described in co-pending International Patent Application No. PCT/US18/56671 (Lee et al.; see, e.g., FIGS. 15*a-c* and associated description). The degree of taper in the side walls can be chosen to accommodate heterogeneous filler within the perforations. The tapering of the perforations also narrows one side of the apertures, a feature that can help prevent heterogeneous filler from escaping through the perforated film.

Optionally and as shown in the figures, the perforations have a generally uniform spacing with respect to each other. If so, the perforations may be arranged in a two-dimensional grid pattern or staggered pattern. The perforations could also be disposed on the wall in a randomized configuration where the perforation locations are irregular, but the perforations are nonetheless evenly distributed across the wall on a macroscopic scale.

In some embodiments, the perforations are of essentially uniform diameter along the wall. Alternatively, the perforations could have some distribution of diameters. In either case, the average narrowest diameter of the perforations can be less than, equal to, or greater than 10 micrometers, 15, 20, 25, 30, 35, 40, 45, 50, 60, 70, 80, 90, 100, 110, 120, 150, 170, 200, 250, 300, 350, 400, 450, 500, 600, 700, 800, 900, 1000, 1500, 2000, 2500, 3000, 4000, or 5000 micrometers. For clarity, the diameter of non-circular holes is defined herein as the diameter of a circle having the equivalent area as the non-circular hole in plan view.

The porosity of the perforated film is a dimensionless quantity representing the fraction of a given volume not occupied by the film. In a simplified representation, the perforations can be assumed to be cylindrical, in which case porosity is well approximated by the percentage of the surface area of the wall displaced by the perforations in plan view. In exemplary embodiments, the wall can have a porosity of 0.1% to 80%, 0.5% to 70%, or 0.5% to 60%. In some embodiments, the wall has a porosity less than, equal to, or greater than 0.1%, 0.2, 0.3, 0.4, 0.5, 0.7, 1, 2, 3, 4, 5, 6, 7, 8, 9, 10, 15, 20, 25, 30, 35, 40, 45, 50, 55, 60, 65, 70, 75, or 80%.

The film material can have a modulus (e.g., flexural modulus) suitably tuned to vibrate in response to incident sound waves having relevant frequencies. Along with the vibrations of the air plugs within the perforations, local vibrations of the wall itself can dissipate sound energy and enhance transmission loss through the acoustic article. The flexural modulus, reflecting the stiffness, of the wall also directly affects its acoustic transfer impedance.

In some embodiments, the film comprises a material having a flexural modulus of from 0.2 GPa to 10 GPa, 0.2 GPa to 7 GPa, 0.2 GPa to 4 GPa, or in some embodiments, less than, equal to, or greater than a flexural modulus of 0.2 GPa, 0.3, 0.4, 0.5, 0.7, 1, 2, 3, 4, 5, 6, 7, 8, 9, 10, 12, 15, 17, 20, 25, 30, 35, 40, 50, 60, 70, 80, 90, 100, 120, 140, 160, 180, 200, or 210 GPa.

Suitable thermoplastic polymers typically have a flexural modulus in the range of from 0.2 GPa to 5 GPa. Addition of fibers or other fillers can, in some embodiments, increase the flexural modulus of these materials to 20 GPa. Thermoset polymers generally have a flexural modulus in the range of from 5 GPa to 40 GPa. Useful polymers include polyolefins, polyesters, fluoropolymers, polylactic acid, polyphenylene sulfide, polyacrylates, polyvinylchloride, polycarbonates, polyurethanes, and blends thereof.

Exemplary perforated film configurations, ways of making the same, and acoustic performance characteristics are described in U.S. Pat. No. 6,617,002 (Wood), U.S. Pat. No. 6,977,109 (Wood), and U.S. Pat. No. 7,731,878 (Wood), U.S. Pat. No. 9,238,203 (Scheibner et al.), and U.S. Patent Publication No. 2005/0104245 (Wood).

In some embodiments, the porous layer is comprised of a particulate bed. The particulate bed may be made entirely from the heterogeneous filler. Alternatively, the particulate bed can include at least some particles that are not the heterogeneous filler. The particulate bed may include any of the heterogeneous fillers described herein, zeolite, Metal Organic Framework (MOF), perlite, alumina, glass beads, and mixtures thereof. None, some, or all of the particles of the particulate bed may be acoustically active.

The porosity of the particulate bed can be adjusted in part based on the size distribution of the particles. The particles may be in a range of from 0.1 micrometers to 2000 micrometers, from 5 micrometers to 1000 micrometers, from 10 micrometers to 500 micrometers, or in some embodiments, less than, equal to, or greater than, 0.1 micrometers, 0.5, 1, 2, 5, 10, 20, 30, 40, 50, 70, 100, 200, 300, 400, 500, 700, 1000, 1500, or 2000 micrometers.

The aforementioned porous layers can be generally characterized by their specific acoustic impedance, or the ratio in frequency space of pressure differences across the layer and the effective velocity approaching the layer surface. In the theoretical model based on a rigid film with perforations, for example, the velocity derives from air moving into and out of the holes. If the film is flexible, motion of the wall can contribute to the acoustic impedance calculation. Specific acoustic impedance generally varies as a function of frequency and is a complex number, which reflects the fact that pressure and velocity waves can be out of phase with each other.

As used herein, specific acoustic impedance is measured in MKS Rayls, in which 1 MKS Rayl is equal to 1 pascal-second per meter ($Pa \cdot s \cdot m^{-1}$), or equivalently, 1 newton-second per cubic meter ($N \cdot s \cdot m^{-3}$), or alternatively, 1 $kg \cdot s^{-1} \cdot m^{-2}$.

A porous layer can also be characterized by its transfer impedance. For a perforated film, transfer impedance is the difference between the acoustic impedance on the incident side of the porous layer and the acoustic impedance one would observe if the perforated film were not present—that is, the acoustic impedance of the air cavity alone.

The flow resistance is the low frequency limit of the transfer impedance. Experimentally, this can be estimated by blowing a known, small velocity of air at the porous layer and measuring the pressure drop associated therewith. The flow resistance can be determined as the measured pressure drop divided by the velocity.

For embodiments that include a perforated film, the flow resistance through the perforated film alone (without the heterogeneous filler) can be from 50 MKS Rayls to 8000 MKS Rayls, 100 MKS Rayls to 4000 MKS Rayls, or 400 MKS Rayls to 3000 MKS Rayls. In some embodiments, the flow resistance through the perforated film can be less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

For embodiments that include a non-woven fibrous layer, the flow resistance through the non-woven fibrous layer alone (without the heterogeneous filler) can be from 50 MKS Rayls to 8000 MKS Rayls, 100 MKS Rayls to 4000 MKS Rayls, or 400 MKS Rayls to 3000 MKS Rayls. In some embodiments, the flow resistance through the non-woven fibrous layer can be less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

The flow resistance through the overall acoustic article can be from 100 MKS Rayls to 8000 MKS Rayls, 120 MKS Rayls to 5000 MKS Rayls, or 150 MKS Rayls to 4000 MKS Rayls. In some embodiments, the flow resistance through the overall acoustic article is less than, equal to, or greater than 10 MKS Rayls, 20, 30, 40, 50, 70, 100, 120, 150, 180, 200, 250, 300, 400, 500, 600, 700, 1000, 1100, 1200, 1500, 1700, 2000, 2500, 3000, 3500, 4000, 4500, 5000, 5500, 6000, 6500, 7000, 7500, or 8000 MKS Rayls.

Heterogeneous Fillers

The acoustic articles described herein can incorporate one or more heterogeneous fillers that are capable of providing enhanced acoustic properties. Each of the heterogeneous fillers referred to in the embodiments above may independently have distinct characteristics, as described below.

Exemplary heterogeneous fillers include heterogeneous fillers that are porous and/or fine. Porous and/or fine fillers that can be incorporated into the provided acoustic articles include particles of clay, diatomaceous earth, graphite, glass bubbles, polymeric filler, non-layered silicate, plant-based filler, and mixtures thereof. Filler particles can have various shapes, including that of flakes, powders and fibers. The particles may in some cases, be primary particles that are agglomerated (i.e., aggregated) into larger particles.

Clay fillers are widely available and commonly used in rubber compounding applications to provide reinforcement and improved physical or processing properties. As used herein, clays include any of a variety of hydrous aluminosilicate minerals found in nature, and generally display a stacked sheet-like microstructure. A primary component of clays is kaolin. Kaolin, sometimes referred to as kaolinite, is characterized by alternating layers of alumina and silica. Another useful clay is bentonite, an absorbent aluminum phyllosilicate clay comprised mostly of montmorillonite. Other clays can be purely synthetic and not obtained from a natural source. One such synthetic clay is LAPONITE, which is comprised of silica layers, octahedrally coordinated magnesium, and alkali metal ions.

In some cases, clay fillers can be converted into other materials by a heating process known as calcining. Calcining temperatures can range from 800-1000° C. At these temperatures, water of hydration within the clay can be driven out. When fully calcined, the individual mineral platelets become fused together and the clays can become relatively inert.

Heterogeneous fillers may also include non-layered silicate materials. Non-layered silicates include alkali silicates, alkaline earth silicates, non-zeolitic aluminosilicates, and geopolymers. Such materials may or may not be zeolites. An example of a non-zeolitic aluminosilicate material is nepheline, which is an aluminosilicate of sodium and potassium.

Diatomaceous earth is made from the fossilized remains of tiny, aquatic organisms called diatoms. These fossilized remains are primarily composed of silica, but also include small amounts of alumina, and iron oxide. In filler form, it is a powder with a polydisperse particle size distribution, generally ranging from 10 micrometers to 200 micrometers. Optionally, diatomaceous earth can be mechanically processed by grinding or the like to reduce its median particle size. Like the clay materials above, diatomaceous earth can be calcined to remove impurities and undesirable volatile components. Chemical processing can also be employed to remove impurities.

Graphite fillers can be made from expanded graphite, unexpanded graphite, or a mixture thereof. Graphite is a crystalline allotropic form of carbon and can be obtained from natural sources or produced synthetically by heating petroleum coke to approximately 3000° C. in a furnace. Graphite is unexpanded in its naturally occurring form. It can be converted to expanded graphite by intercalating chemical compounds, such as sulfuric acid, between the $sp^2$-hybridized carbon sheets that comprise graphite. One can then heat the graphite particles or flakes to a temperature above the exfoliation temperature of the graphite (typically between 150° C. and 300° C.) which causes the graphite layers to separate from each other and expand to several times their original thickness.

Although not necessarily graphitic, other forms of porous carbon may also be used as heterogeneous filler. Useful porous carbons include activated and vermiculite carbon fillers, which have unique acoustic properties based on their varying degrees of porosity. Details concerning these materials are described co-pending International Patent Application No. PCT/US18/56671 (Lee et al.) and its disclosure of porous carbon fillers is expressly incorporated by reference herein.

Porous polymer fillers can have a wide range of porosities, making them suitable for acoustic absorption at frequencies below 1000 Hz. These absorption properties have been observed in many polymer compositions, including polypropylene, divinylbenzene-maleic anhydride, styrene-divinylbenzene, and acrylic polymers. Porous polymer fillers include open-cell foams, closed-cell foams, and combinations thereof. Examples of fillers comprised of open-cell polymeric foams include polyolefin foam fillers available under the trade designation ACCUREL MP by Evonik Industries AG in Essen, Germany.

Fillers may, in some cases, be aggregated (i.e. agglomerated). Primary filler particles may be aggregated to each other by particle-to-particle interactions. Such interactions can derive from secondary bond forces or electrostatic forces. In some embodiments, at least some of the polymer particles are sintered together under slight pressure and heat to form agglomerates. The heat may be provided using any known method, including steam, high-frequency radiation, infrared radiation, or heated air. Aggregation of particles may also be achieved by using adhesives or binders.

Particle aggregates may be regularly or irregularly shaped. Preferably, aggregates stay together in intended use with most particles retaining their specified dimensions but are not necessarily "crushproof." In some embodiments, the pores within the acoustic article can be borne entirely from the interstitial spaces created amongst the primary filler particles.

Plant-based fillers include cellulosic fillers such as wood flour. Wood flour is composed of fine particles of wood, and generally obtained from woodworking operations such as sawing, milling, planing, routing, drilling and sanding. Other plant-based fillers include flax, jute, sisal, hemp, wheat and rice straw, rice husk, ash, starches, and lignin. Some of these fillers are fibrous in nature, offering benefits as lightweight reinforcing fillers in composite materials. Cork and waste shells from nuts contain cellulose and lignin. Plant-based fillers can be highly porous.

Other possible heterogeneous fillers can include bio-based fillers that are not plant-based. These include filler particles derived from waste streams like chicken feathers or shellfish shells. Filler may also derive from fungi, sea sponges, and other biological products outside the plant kingdom.

The heterogeneous fillers above, independently, can have any suitable median particle size. Filler particles can be sized to create interstitial voids having a desired size distribution when incorporated into a given porous layer. Such voids can represent spaces between and amongst filler particles, non-woven fibers (if present), polymeric or inorganic struts (if present), or combinations thereof. Median particle size of the filler particles is a parameter that can also be used to adjust the permeability (and overall flow resistance) of the acoustic article.

The heterogeneous filler can have a median particle size of from 1 micrometer to 1000 micrometers, from 1 micrometer to 100 micrometers, from 100 micrometers to 1000 micrometers, from 100 micrometers to 800 micrometers, or in some embodiments, less than, equal to, or greater than 1 micrometer, 2, 3, 4, 5, 7, 10, 15, 20, 25, 30, 35, 40, 45, 50, 60, 70, 80, 90, 100, 150, 200, 250, 300, 350, 400, 450, 500, 600, 700, 800, 900, or 1000 micrometers.

The heterogeneous fillers disposed within a given porous layer can have any suitable particle size distribution to provide a desired acoustic response. The particle size distribution may be monodisperse or polydisperse. The particle size distribution may be monomodal or polymodal, independently of how many heterogeneous filler compositions are present in the porous layer. The heterogeneous filler can have a Dv50/Dv90 particle size ratio of from 0.25 to 1, 0.3 to 0.9, 0.4 to 0.8, or in some embodiments, less than, equal to, or greater than 0.25, 0.3, 0.35, 0.4, 0.45, 0.5, 0.55, 0.6, 0.65, 0.7, 0.75, 0.8, 0.85, 0.9, 0.95, or 1.

Dv50 and Dv90 can be defined by the volume-weighted size distribution as determined using laser scattering. Assuming a volume weighted distribution, Dv50 refers to the median particle diameter and Dv90 refers to the particle diameter for which 90% of the total volume of filler particles would have a smaller diameter. One can also adjust such a distribution by using testing sieving to exclude particles of certain diameters.

The heterogeneous fillers above, independently, can have any suitable specific surface area. Based on their porous nature, it is possible for the heterogeneous filler to display high surface areas. Having a high surface area can reflect a high degree of complexity and tortuosity of the pore structure, leading to greater internal reflections and energy transfer to the solid structure through frictional losses. Advantageously, this can be manifested as absorption of airborne noise.

The specific surface area of the heterogeneous filler can be from 0.1 $m^2/g$ to 100 $m^2/g$, from 1 $m^2/g$ to 100 $m^2/g$, from 100 $m^2/g$ to 800 $m^2/g$, from 0.1 $m^2/g$ to 800 $m^2/g$, or in some embodiments, less than, equal to, or greater than 0.1 $m^2/g$, 0.2, 0.5, 0.7, 1, 2, 5, 10, 20, 50, 100, 120, 150, 200, 250, 300, 350, 400, 450, 500, 6000, 700, 800, 900, 1000, 1500, 2000, 2500, 3000, 3500, 4000, 4500, 5000, 6000, 7000, 8000, 9000, or 10,000 $m^2/g$.

Surface area can be measured based on the sorption of either nitrogen or krypton gas at liquid nitrogen temperatures onto the surface of a given material. These measurements can be performed using an instrument known a gas sorption analyzer. In this measurement, one can generate an isotherm (volume of gas adsorbed at standard temperature and pressure per unit mass versus relative pressure) by dosing a sample with gas. Then, by applying a modified form of the Langmuir equation known as the Brunauer-Emmett-Teller (BET) equation to the isotherm, it is possible to calculate the specific surface area. This value is known as the BET specific surface area. In some embodiments, the specific surface area, as referred to herein, is the BET specific surface area.

In some embodiments, the heterogeneous filler is characterized by exceedingly fine pores. The heterogeneous filler can have an average pore size of from 0.4 nanometers to 50 micrometers, from 1 nanometer to 40 micrometers, from 2.5 nanometers to 30 micrometers, or in some embodiments, less than, equal to, or greater than 0.1 nanometers, 0.2, 0.3, 0.4, 0.5, 1, 1.2, 1.5, 1.7, 2, 3, 4, 5, 7, 10, 15, 20, 25, 30, 40, 50, 70, 100, 150, 200, 250, 300, 350, 400, 450, 500, 600, 700, 800, 900 nanometers, 1 micrometer, 2, 3, 4, 5, 7, 10, 15, 20, 25, 30, 35, 40, 45, or 50 micrometers.

Heterogeneous filler particles can have pore sizes that are far smaller than conventional fillers used in acoustic applications. For example, the smallest pores of certain polymers of intrinsic microporosity can be less than 2 nm in diameter. Calcined diatomaceous earth, in contrast, contains pores that are generally several hundred nanometers to several tens of micrometers. Generally, the heterogeneous filler can have a minimum pore size of up to 10000 nm, up to 5000 nm, up to 2000 nm, up to 1000 nm, up to 500 nm, up to 400 nm, up to 300 nm, up to 200 nm, up to 100, up to 50, up to 20, up to 10, up to 5, up to 2, and up to 1 nm.

The heterogeneous filler can have a total pore volume of from 0.01 $cm^3/g$ to 5 $cm^3/g$. In some embodiments, the total pore volume can be less than, equal to, or greater than, 0.01 $cm^3/g$, 0.02, 0.05, 0.07, 0.1, 0.2, 0.3, 0.4, 0.5, 0.7, 1, 1.2, 1.4, 1.6, 1.8, 2, 2.5, 3, 3.5, 4, 4.5, or 5 $cm^3/g$.

Bonding of the heterogeneous filler to a porous layer can be facilitated by modification of the particle surfaces via silanes or other metal or metalloid complexes. Depending on the functionalities present, either inter- or intramolecular bonding to the layer can be achieved. Polymeric heterogeneous fillers (or aggregates that contain a polymeric binder) can be modified by a variety of routes, including various forms of grafting, solvent-treatment, and e-beam irradiation. These modifications can also facilitate bonding of particles to the porous layer.

Methods of Manufacture

The provided acoustic articles can be assembled using any of a number of suitable manufacturing methods.

For embodiments in which the porous layer is a non-woven fibrous web, heterogeneous filler can be incorporated into the constituent fibers either during or after the direct formation of the fibers. Where the non-woven fibrous web is made using a melt blowing process, for example, the heterogeneous filler may be conveyed and co-mingled with the streams of molten polymer as they are blown onto a rotating collector drum. The heterogeneous filler may be entrained within a flow of heated air that converges with the hot air used to attenuate the melt blown fibers. An exemplary process is described in U.S. Pat. No. 3,971,373 (Braun). In a similar fashion, particles of heterogeneous filler can be conveyed into an air laid process, such as the process use to manufacture porous layers made from recycled textile fibers (i.e., shoddy).

Heterogeneous filler can also be added after the non-woven fibrous layer has been made. For example, the porosity of the non-woven fibrous layer could enable the heterogeneous filler to infiltrate into its interstitial spaces by homogeneously dispersing the heterogeneous filler into a liquid medium such as water, followed by roll coating or slurry coating the particle-filled medium onto the non-woven porous layer. As an alternative to using a liquid medium, one can entrain the heterogeneous filler in a gaseous stream, such as an air stream, and then direct the stream toward the non-woven layer to fill it.

Alternatively, heterogeneous filler can also be enmeshed into the porous layer by agitation. In one embodiment of this method, a non-woven fibrous layer is placed over a flat surface and a cylindrical conduit placed over it to define a coating area. Particles of the heterogeneous filler can then be poured into the conduit and the assembly agitated until the particles are fully migrated into the non-woven structure through its open pores. A similar method may be used for porous layers comprised of open-celled foams.

Construction of multilayered acoustic articles and attachment to substrates can include one or more lamination steps. Lamination may be achieved using an adhesive bond. Preferably, any adhesive layers used do not interfere with sound penetration into the absorbing layer. Alternatively, or in combination, physical entanglement of fibers may be used to improve interlayer adhesion. Mechanical bonds, using fasteners for example, are also possible.

The acoustic articles can also be edge sealed to prevent particle egress. Such containment can be achieved by densifying the edges, filling edges with a resin, quilting the acoustic article, or fully encasing the acoustic article in a sleeve to prevent particle movement or egress. Edge sealing can be desirable to improve product lifetime, durability, and facilitate handling and mounting. Edge sealing can also be performed for aesthetic reasons.

In yet another embodiment, a non-woven fibrous layer can be sequentially sprayed with an adhesive and then with the filler particles. In some instances, the adhesive may be provided in the form of hot melt fibers.

While not intended to be limiting, various exemplary embodiments are enumerated as follows:

1. An acoustic article comprising: a porous layer; and heterogeneous filler received in the porous layer, wherein the heterogeneous filler has a median particle size of from 1 micrometer to 100 micrometers and a specific surface area of from 0.1 $m^2/g$ to 100 $m^2/g$, wherein the acoustic article has a flow resistance of from 100 MKS Rayls to 8000 MKS Rayls.
2. An acoustic article comprising: a porous layer; and heterogeneous filler received in the porous layer, wherein the heterogeneous filler has a median particle size of from 100 micrometers to 800 micrometers and a specific surface area of from 100 $m^2/g$ to 800 $m^2/g$, wherein the acoustic article has a flow resistance of from 100 MKS Rayls to 8000 MKS Rayls.
3. An acoustic article comprising: a porous layer; and heterogeneous filler received in the porous layer, wherein the heterogeneous filler has a median particle size of from 100 micrometers to 1000 micrometers and a specific surface area of from 1 $m^2/g$ to 100 $m^2/g$, wherein the acoustic article has a flow resistance of from 100 MKS Rayls to 8000 MKS Rayls.
4. The acoustic article of any one of embodiments 1-3, wherein the heterogeneous filler comprises clay, diatomaceous earth, graphite, glass bubbles, polymeric filler, non-layered silicate, plant-based filler, or a combination thereof.
5. The acoustic article of embodiment 4, wherein the heterogeneous filler comprises a non-layered silicate, and wherein the non-layered silicate is an alkali silicate, alkaline earth silicate, non-zeolitic aluminosilicate, or geopolymer.
6. The acoustic article of embodiment 4, wherein the heterogeneous filler comprises graphite, and wherein the graphite is unexpanded graphite.
7. The acoustic article of embodiment 4, wherein the heterogeneous filler comprises a porous polymer filler, and wherein the porous polymer filler comprises a polyolefin foam, polyvinylpyrrolidone, divinylbenzene, divinylbenzene-maleic anhydride, styrene-divinylbenzene or polyacrylate.
8. The acoustic article of embodiment 4, wherein the heterogeneous filler comprises a plant-based filler, and wherein the plant-based filler comprises wood flour.
9. An acoustic article comprising: a porous layer; and heterogeneous filler received in the porous layer, wherein the heterogeneous filler comprises diatomaceous earth, plant-based filler, unexpanded graphite, polyolefin foam, or a combination thereof, having a median particle size of from 1 micrometer to 1000 micrometers, and a specific surface area of from 0.1 $m^2/g$ to 800 $m^2/g$, wherein the acoustic article has a flow resistance of from 100 MKS Rayls to 8000 MKS Rayls.
10. The acoustic article of embodiment 9, wherein the heterogeneous filler comprises diatomaceous earth, and wherein the diatomaceous earth has a median particle size of from 5 micrometers to 40 micrometers, and a specific surface area of from 1 $m^2/g$ to 50 $m^2/g$.

11. The acoustic article of embodiment 10, wherein the heterogeneous filler has a specific surface area of from 1 $m^2/g$ to 40 $m^2/g$.
12. The acoustic article of embodiment 11, wherein the heterogeneous filler has a specific surface area of from 20 $m^2/g$ to 40 $m^2/g$.
13. The acoustic article of embodiment 9, wherein the heterogeneous filler comprises plant-based filler, and wherein the plant-based filler is wood flour having a median particle size of from 10 micrometers to 1000 micrometers and a specific surface area of from 0.1 $m^2/g$ to 200 $m^2/g$.
14. The acoustic article of embodiment 13, wherein the wood flour has a median particle size of from 50 micrometers to 800 micrometers and a specific surface area of from 0.1 $m^2/g$ to 50 $m^2/g$.
15. The acoustic article of embodiment 14, wherein the wood flour has a median particle size of from 50 micrometers to 400 micrometers and a specific surface area of from 0.1 $m^2/g$ to 10 $m^2/g$.
16. The acoustic article of embodiment 9, wherein the heterogeneous filler comprises unexpanded graphite, and wherein the unexpanded graphite has a median particle size of from 1 micrometer to 1000 micrometers and a specific surface area of from 0.1 $m^2/g$ to 500 $m^2/g$.
17. The acoustic article of embodiment 16, wherein the unexpanded graphite has a median particle size of from 5 micrometers to 800 micrometers and a specific surface area of from 1 $m^2/g$ to 300 $m^2/g$.
18. The acoustic article of embodiment 17, wherein the unexpanded graphite has a median particle size of from 100 micrometers to 1000 micrometers and a specific surface area of from 1 $m^2/g$ to 100 $m^2/g$.
19. The acoustic article of embodiment 9, wherein the heterogeneous filler comprises polyolefin foam, and wherein the polyolefin foam has a median particle size of from 100 micrometers to 1000 micrometers and a specific surface area of from 1 $m^2/g$ to 100 $m^2/g$.
20. The acoustic article of embodiment 19, wherein the polyolefin foam has a median particle size of from 100 micrometers to 500 micrometers and a specific surface area of from 1 $m^2/g$ to 50 $m^2/g$.
21. The acoustic article of embodiment 20, wherein the polyolefin foam has a median particle size of from 100 micrometers to 200 micrometers and a specific surface area of from 5 $m^2/g$ to 35 $m^2/g$.
22. The acoustic article of any one of embodiments 1-21, wherein the heterogeneous filler is dispersed across the entire thickness of the porous layer.
23. The acoustic article of any one of embodiments 1-22, wherein the heterogeneous filler has an open-cell structure.
24. The acoustic article of any one of embodiments 1-23, wherein the heterogeneous filler is agglomerated.
25. The acoustic article of any one of embodiments 1-24, wherein the heterogeneous filler has a Dv50/Dv90 particle size ratio of from 0.25 to 1.
26. The acoustic article of embodiment 25, wherein the heterogeneous filler has a Dv50/Dv90 particle size ratio of from 0.3 to 0.9.
27. The acoustic article of embodiment 26, wherein the heterogeneous filler has a Dv50/Dv90 particle size ratio of from 0.4 to 0.8.
28. The acoustic article of any one of embodiments 1-27, wherein the porous layer comprises a non-woven fibrous layer having a plurality of fibers.
29. The acoustic article of embodiment 28, wherein the plurality of fibers has a median fiber diameter of from 0.1 micrometers to 2000 micrometers.
30. The acoustic article of embodiment 29, wherein the plurality of fibers has a median fiber diameter of from 5 micrometers to 1000 micrometers.
31. The acoustic article of embodiment 30, wherein the plurality of fibers has a median fiber diameter of from 10 micrometers to 500 micrometers.
32. The acoustic article of any one of embodiments 28-31, wherein the plurality of fibers comprise a polymer selected from polyolefin, polypropylene, polyethylene, polyester, polyethylene terephthalate, polybutylene terephthalate, polyamide, nylon 6,6, polyurethane, polybutene, polylactic acid, polyphenylene sulfide, polysulfone, liquid crystalline polymer, polyethylene-co-vinylacetate, polyacrylonitrile, cyclic polyolefin, or copolymer or blend thereof.
33. The acoustic article of any one of embodiments 28-32, wherein the plurality of fibers comprise a thermoplastic semi-crystalline polymer.
34. The acoustic article of any one of embodiments 28-33, wherein the plurality of fibers comprise melt blown fibers.
35. The acoustic article of any one of embodiments 28-34, wherein the plurality of fibers comprise recycled textile fibers.
36. The acoustic article of any one of embodiments 28-35, wherein the plurality of fibers comprise glass fibers or ceramic fibers.
37. The acoustic article of any one of embodiments 28-36, wherein the plurality of fibers have an average fiber-to-fiber spacing of from 0 micrometers to 1000 micrometers.
38. the acoustic article of embodiment 37, wherein the plurality of fibers have an average fiber-to-fiber spacing of from 10 micrometers to 500 micrometers.
39. The acoustic article of embodiment 38, wherein the plurality of fibers have an average fiber-to-fiber spacing of from 20 micrometers to 300 micrometers.
40. The acoustic article of any one of embodiments 1-27, wherein the porous layer comprises an open-cell polymeric foam.
41. The acoustic article of any one of embodiments 1-27, wherein the porous layer comprises a perforated film.
42. The acoustic article of embodiment 41, wherein the perforated film has a thickness of from 1 micrometer to 10 centimeters.
43. The acoustic article of embodiment 42, wherein the perforated film has a thickness of from 30 micrometers to 1 centimeter.
44. The acoustic article of embodiment 43, wherein the perforated film has a thickness of from 50 micrometers to 5000 micrometers.
45. The acoustic article of any one of embodiments 41-44, wherein the perforations have an average narrowest diameter of from 10 micrometers to 5000 micrometers.
46. The acoustic article of embodiment 45, wherein the perforations have an average narrowest diameter of from 10 micrometers to 3000 micrometers.
47. The acoustic article of embodiment 46, wherein the perforations have an average narrowest diameter of from 20 micrometers to 1500 micrometers.
48. The acoustic article of any one of embodiments 41-47, wherein the perforated film comprises a material having a flexural modulus of from 0.2 GPa to 10 GPa.

49. The acoustic article of embodiment 48, wherein the perforated film comprises a material having a flexural modulus of from 0.2 GPa to 7 GPa.
50. The acoustic article of embodiment 49, wherein the perforated film comprises a material having a flexural modulus of from 0.2 GPa to 4 GPa.
51. The acoustic article of any one of embodiments 1-50, wherein the heterogeneous filler has an average inter-particle spacing of from 20 micrometers to 4000 micrometers.
52. The acoustic article of embodiment 51, wherein the heterogeneous filler has an average interparticle spacing of from 50 micrometers to 2000 micrometers.
53. The acoustic article of embodiment 52, wherein the heterogeneous filler has an average interparticle spacing of from 100 micrometers to 1000 micrometers.
54. The acoustic article of any one of embodiments 1-53, wherein the porous layer filled with heterogeneous filler has a solidity of from 5 percent to 40 percent.
55. The acoustic article of any one of embodiments 54, wherein the porous layer filled with heterogeneous filler has a solidity of from 8 percent to 35 percent.
56. The acoustic article of any one of embodiments 55, wherein the porous layer filled with heterogeneous filler has a solidity of from 10 percent to 30 percent.
57. The acoustic article of any one of embodiments 1-56, further comprising a plurality of Helmholtz resonators in contact with the porous layer.
58. A method of making an acoustic article comprising: directly forming a non-woven fibrous web; delivering a heterogeneous filler into the non-woven fibrous web as the non-woven fibrous web is being directly formed, the heterogeneous filler comprising diatomaceous earth, plant-based filler, unexpanded graphite, polyolefin foam, or a combination thereof, having a median particle size of from 1 micrometer to 1000 micrometers, and a specific surface area of from 0.1 $m^2/g$ to 800 $m^2/g$, wherein the acoustic article has a flow resistance of from 100 MKS Rayls to 8000 MKS Rayls.
59. the method of embodiment 58, wherein the non-woven fibrous web is directly formed using a melt-blown or air laid process.
60. The method of any one of embodiments 58 or 59, wherein the non-woven fibrous web comprises a non-woven fibrous web comprising a plurality of fibers, the heterogeneous filler at least partially enmeshed in the plurality of fibers.
61. A method of using the acoustic article of any one of embodiments 1-57, comprising: disposing the acoustic article proximate to a surface to damp vibrations of the surface.
62. A method of using the acoustic article of any one of embodiments 1-57, comprising: disposing the acoustic article proximate to an air cavity to absorb sound energy being transmitted through the air cavity.
63. The method of using the acoustic article of embodiment 62, wherein absorption of sound energy occurs with essentially zero net flow of fluid through the acoustic article.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

Materials

| Designation | Description | Source |
|---|---|---|
| 3860X | Polypropylene homopolymer resin available under the designation 3860X | Total Petrochemicals USA, Houston, TX. United States |
| MF650Y | Polypropylene metallocene homopolymer resin available under the designation Metocene MF650Y | LyondellBasell Industries, Houston, TX. United States |
| PP-1 | Film-grade polypropylene resin, available under the designation "C700-35N" | Braskem, São Paulo, Brazil |
| RHOPLEX VSR-50 | Polyacrylate binder available under the trade designation RHOPLEX VSR-50 | DowDuPont Inc., Midland, MI. United States |
| A4958 | Synthetic graphite | Asbury Carbons Inc., Asbury, NJ. United States |
| CLARCEL 78 | Natural diatomaceous earth available under the trade designation CLARCEL 78 | Calgon Carbon Corporation, Moon Township, PA. United States |
| CLOISITE Na+ | Natural bentonite clay available under the trade designation CLOISITE Na+ | Byk-Chemie GmbH Wesel, Germany |
| FlexiThix | Polyvinylpyrrolidone powder available under the trade designation FLEXITHIX | Ashland Global Specialty Chemicals Inc., Covington, KY. United States |
| Ground Nutshell | Ground almond nutshells (Grit Size 16/325) | Composition Materials Company, Inc., Milford, CT. United States |
| HS-76 | Porous copolymer powder assembled according to Example 1 in U.S. Pat. No. 9,422,411 (Sahouani et al) except that the initial mixture contained 10 wt. % sulfoethyl methacrylate, 45 wt. % PEG dimethacrylate, and 45 wt. % phenoxyethylacrylate | 3M Company, St. Paul, MN. United States |
| iM16K | Glass bubbles available under the designation Glass Bubbles iM16K | 3M Company, St. Paul, MN. United States |

TABLE 1-continued

| Materials | | |
|---|---|---|
| Designation | Description | Source |
| iM30K | Glass bubbles available under the designation Glass Bubbles iM16K | 3M Company, St. Paul, MN. United States |
| XG-3 | Calcined diatomaceous earth available under the trade designation PURIFIDE XG-3 | EP Minerals (a U.S. Silica Company), Reno, NV. United States |
| Maple (10010) | Hardwood flour; lignocellulosic plant-based material | American Wood Fibers, Inc., Columbia, MD. United States |
| MP1004 | Porous powder made from polypropylene available under the designation ACCUREL MP1004 | Evonik GmbH, Essen, Germany |
| MN4X | Natural diatomaceous earth available under the trade designation CELATOM MN4X | EP Minerals, Reno (a U.S. Silica Company), NV. United States |
| Nepheline | Nepheline Syenite | 3M Company, St. Paul, MN. United States |
| Oak (40B3) | Hardwood flour; lignocellulosic plant-based material | American Wood Fibers, Inc., Columbia, MD |
| Pine (4026) | Softwood flour; lignocellulosic plant-based material | American Wood Fibers, Inc., Columbia, MD. United States |
| Pine (10020) | Softwood flour; lignocellulosic plant-based material | American Wood Fibers, Inc., Columbia, MD. United States |
| Ruby Sand | Calcined montmorillonite | Zeo Inc., McKinney, TX. United States |
| AC 32 × 60 | Activated carbon particles, mesh size 32 × 60, Grade GWH | Kuraray Chemical Co., LTD, Osaka, Japan |
| DVB-MA | Porous polymer made from poly(divinylbenzene-co-maleic anhydride). Assembled as described for the precursor polymeric material of Example 14 of U.S. Patent Publication 2018/0345246 | 3M Company, St. Paul, MN. United States |
| CYPBRID 1 | Synthetic, surface-treated graphite available under the trade designation CYPBRID 1 | Imerys S.A., Paris, France |
| HPX5 | Wood-based activated carbon powder available under the trade designation ACTICARBONE HPX5 | Calgon Carbon Corporation, Moon Township, PA. United States |
| LAPONITE RD | Synthetic laponite clay available under the designation LAPONITE RD | Byk-Chemie GmbH Wesel, Germany |
| TC307 | Synthetic graphite available under the designation TC307 | Asbury Carbons Inc., Asbury, NJ. United States |

Test Methods

Laser Scattering Particle Size Analysis

Size distributions for materials that were not classified were measured by laser scattering using a Horiba LA-950V2 (Horiba Ltd., Kyoto, Japan). A dispersion of the given material was made in either water or methyl ethyl ketone (MEK) at roughly 0.3 wt. % to 0.5 wt. % solids for the various materials. These dispersions were added a measurement cell, which contained the corresponding solvent used for the dispersion. This addition was done until the transmittance was between the recommended levels for the instrument. The standard algorithm in the supplied software was used to for determining the distribution based on the scattering measurements. In these calculations, 1.33 and 1.3791 were used as the liquid refractive indices for water and methyl ethyl ketone (MEK). Refractive indices used for the solids are listed in Table 2. Lower and upper particle size correspond to Dv10 and Dv90.

Gas Sorption

Materials were analyzed using a Micromeritics ASAP 2020 (Micromeritics Instrument Corp., Norcross, GA) gas sorption analyzer. Specimens were loaded into a bulbed Micromeritics 1.27 cm (½ inch) diameter sample tube and outgassed at 0.4-0.9 Pa (3-7 micron of Mercury). Temperatures and times for the outgassing are given in Table 2. Helium was used for the free space determination, after nitrogen sorption analysis, both at ambient temperature and at 77 K. Isotherms were measured using nitrogen gas at 77 K, and multi-point Brunauer-Emmett-Teller (BET) specific surface area calculations were done in the pressure range between 0.025 P/Po to 0.3 P/Po. The exact points used for this calculation were altered from sample to sample to obtain a positive C-value.

Bulk Density

Bulk densities were measured by following ASTM D7481-18, Method A (loose bulk density).

Skeletal Density—Pycnometry

Skeletal densities for the materials were obtained using a Micromeritics ACCUPYC II 1340 TEC pycnometer (Micromeritics, Norcross, GA, United States). Helium gas was used. Prior to obtaining measurements, the instrument was calibrated for measured volume using a metal ball of a specified, traceable volume. A 3.5 cc cup was used for the measurements, and measurements were taken at ambient temperature.

Normal Incident Acoustical Absorption

Normal incident acoustical absorption was tested according to ASTM E1050-12, "Standard Test Method for Impedance and Absorption of Acoustical Materials Using a Tube, Two Microphones and a Digital Frequency Analysis System". An "IMPEDANCE TUBE KIT (50 HZ-6.4 KHZ)

TYPE 4206" available from Brüel & Kjær (Denmark) was used. The impedance tube was 63 millimeter (mm) in diameter and oriented vertically, with the microphones above the sample chamber. The normal incident absorption coefficient was reported with respect to one third octave band frequencies, using the abbreviation "α". Two samples were tested for each material and the average normal incident absorption coefficient was recorded.

Air Flow Resistance (AFR) Test 1

Air flow resistance was measured from a 13.5 cm (5.25 inch) sample according to ASTM C-522-03 (Reapproved 2009), "Standard Test Method for Airflow Resistance of Acoustical Materials". The instrument used was a "SIGMA Static Airflow Resistance Meter" running "SIGMA-X" software (both obtained from Mecanum, Sherbrooke, Canada).

Air Flow Resistance (AFR) Test 2

A TSI™ Model 8130 high-speed automated filter tester (commercially available from TSI Inc.), was operated with particle generation and measurement turned off. Flowrate was adjusted to 11.1 liters per minute (LPM) and two annular panels masked the measurement area to a 41.3 mm (1.625 inch) diameter circle providing equivalent results for the 114.3 mm (4.5 inch) diameter sample measured at 85 LPM. The sample was placed onto the lower circular plenum opening and the AFT was engaged. An MKS pressure transducer (commercially available from MKS Instruments) within the device measured the pressure drop in mm $H_2O$. The measurement was converted to MKS Rayls using the linear relationship of AFR [MKS Rayls]=71.035×Pressure Drop (in mm $H_2O$ measured at 85 LPM).

Particle Preparation

Particle Agglomeration

Particle agglomeration was performed using the following materials: CLOISITE Na+, Laponite RD, iM30K, CLARCEL 78, TC307, and A4958. RHOPLEX VSR-50 was used as the binder. The weight percentages of acoustically-active particulate, binder, and deionized (DI) water used for creating agglomerated particles are listed in Table 2.

TABLE 2

Particle Agglomerate Batches

| Designation | Acoustic Particulate wt. % | RHOPLEX Binder wt. % | DI Water wt. % |
|---|---|---|---|
| A4958-Agglomerate | 55.0 | 5.0 | 40.0 |
| CLARCEL 78, Calcined-Agglomerate | 43.0 | 5.0 | 52.0 |
| CLOISITE Na+-Agglomerate | 71.0 | 4.0 | 25.0 |
| iM30K-Agglomerate | 62.0 | 5.0 | 33.0 |
| LAPONITE RD-Agglomerate | 59.0 | 4.0 | 37.0 |
| TC307-Agglomerate | 47.0 | 6.0 | 47.0 |

Materials were mixed in a KitchenAid KFC3511GA food processor (Whirlpool Corporation, Benton Charter Township, MI). During addition of the binder and water suspension, the material was periodically broken up using a spatula to ensure uniform distribution of the binder. After mixing, the agglomerates were heated at 50° C. overnight for drying. Once dried, the agglomerates were classified using two wire mesh screens (Retsch GmbH, Haan, Germany), the first with 1-millimeter (mm) openings and second with 106-micrometer openings. Any agglomerated material that passed through the 1-millimeter screen and was blocked by the 106-micrometer screen was used for further acoustic testing.

Calcination

CLARCEL 78 was loaded into porcelain crucibles and heated under static air in a Lindberg/Blue M Heavy Duty Box Furnace (ThermoFisher Scientific, Waltham, MA) at 600° C. for twelve hours.

Milling

The DVB-MA porous copolymer material was milled down using a rotary mill with a 2.0 mm sieve screen by IKA (Wilmington, NC). The milled material was then sieved to isolate all material that was <30 mesh (DVB-MA-1), 30×40 mesh (DVB-MA-2), 40×60 mesh (DVB-MA-3) and >60 mesh (DVB-MA-4) in size by utilizing USA standard test No. 30, 40 and 60 wire mesh sieves (ASTM E-11 standard; Hogentogler and Co., Inc. Columbia, MD) and a Meinzer II Sieve Shaker (CSC Scientific Company, Inc., Fairfax, VA) operated for fifteen minutes before the separated material was collected Geopolymer Assembly Parent sodium geopolymer samples (GEOPOLYMER) were made by dissolving potassium hydroxide (85% in water, Millipore Sigma, Burlington, MA) in deionized water followed by addition of a proportional amount of Sodium Silicate ("STAR," PQ Crop, Malvern, PA) along with metakaolin powder (Metamax, BASF Ludwigshafen, Germany). This mixture was stirred vigorously for about 10 min, and then cast into aplastic container. The parent geopolymer was formulated with the following mole ratios: Si/Al=2.8, Na/Al=3, $H_2O$/Al=10. Polycondensation was performed in a closed vessel in laboratory oven at 60° C. for 24 h. After aging for more than one week, the geopolymer samples were ground in a zirconia vessel containing zirconia milling media using a SPEX 8000 Mixer-mill (SPEXSamplePrep, Metuchen, NJ). The milled GEOPOLYMER was classified using two wire mesh screens (Retsch GmbK, Haan, Germany), the first with 1-millimeter (mm) openings and second with 106-micrometeropenings. Any material that passed through the 1-millimeter screen and was blocked by the 106-micrometer screen was used for fuirther acoustic testing.

Particle/Agglomeration Characterization

Samples (agglomerated and non-agglomerated) underwent Laser Scattering Particle Size Analysis, Gas Sorption, Surface Area, Bulk Density, and Skeletal Density testing and were characterized as represented in Table 3. Particles (agglomerated or non-agglomerated) were dispersed in MEK for Laser Scattering Particle Size Analysis are identified in Table 3. An * indicates that the data was obtained from the manufacturer and ** indicates that the geometric calculation was measured by assuming a d10 sphere size for the particle.

TABLE 3

| Particle Characteristics | | | | | | | | | |
|---|---|---|---|---|---|---|---|---|---|
| Designation | Sieving or Laser Scattering | Refractive Index for Scattering | Lower Particle Size (micrometer) | Median Particle Size (Dv50, micrometers) | Uppcr Particle Size (micrometer) | Outgas Temperature and Time | Surface Area ($m^2$/g) | Bulk Density (g/cc) | Skeletal Density (g/cc) |
| A4958 | Scattering (MEK) | 2.50 | 7 | 12 | 19 | 200° C., 5 h | 9 | 0.40 | 2.25 |
| CLARCEL 78, Calcined | Scattering | 1.46 | 12 | 12 | 44 | 200° C., 5 h | 33 | 0.10 | 2.17 |
| CLOISITE Na+ | Scattering | 1.57 | <1 | 5 | 9 | ° C., 5 h | 51 | 0.47 | 2.49 |
| FlexiThix | Scattering (MEK) | 1.52 | 14 | 18 | 23 | 50° C., 12 h | 10 | 0.20 | 1.23 |
| Ground Nutshell | Scattering | 1.57 | 29 | 200 | 514 | 100° C., 12 h | 1 | 0.47 | 1.46 |
| HS-76 | Scattering | 1.47 | 7 | 14 | 23 | 50° C., 12 h | 4 | 0.26 | 1.24 |
| iM16K | n/a* | n/a* | 12 | n/a | 30 | n/a | <1** | 0.24 | 0.46* |
| iM30K | n/a* | n/a* | 9 | n/a | 28 | n/a | <1** | 0.26 | 0.60* |
| Maple (10010) | Scattering (MEK) | 1.57 | 18 | 88 | 190 | 100° C., 12 h | 1 | 0.21 | 1.49 |
| MN4X | Scattering | 1.46 | 9 | 11 | 13 | 200° C., 5 h | 29 | 0.17 | 2.26 |
| MP1004 | Sieving | n/a | <200 | n/a | 200 | RT, 24 h | 28 | 0.15 | 0.91 |
| Nepheline | Scattering | 1.53 | 3 | 7 | 11 | 200° C., 5 h | 4 | 0.72 | 2.92 |
| Pine (10020) | Scattering | 1.57 | 17 | 73 | 194 | 100° C., 12 h | | 0.14 | 1.48 |
| XG-3 | Scattering | 1.46 | 11 | 23 | 255 | 200° C., 5 h | 3 | 0.19 | 2.46 |
| A4958-Agglomerate | Sieving | n/a | 106 | n/a | 1000 | 50° C., 12 h | 3 | 0.25 | 1.94 |
| CLARCEL 78, Calcined-Agglomerate | Sieving | n/a | 106 | n/a | 1000 | 50° C., 12 h | 25 | 0.32 | 2.17 |
| CLOISITE Na+-Agglomerate | Sieving | n/a | 106 | n/a | 1000 | 50° C., 12 h | 32 | 0.73 | 2.48 |
| iM30K-Agglomerate | Sieving | n/a | 106 | n/a | 100 | n/a | <1** | 0.19 | 0.55 |
| Ruby Sand | Sieving | n/a | 106 | n/a | 1000 | 200° C., 5 h | 76 | 0.57 | 2.51 |
| AC 32x60 | n/a* | n/a* | 250 | n/a | 600 | 25° C., 48 h | 1561 | 0.46 | |
| CYPBRID 1 | Scattering (MEK) | 2.50 | 7 | 15 | 59 | 200° C., 5 h | 281 | 0.45 | 2.21 |
| DVB-MA-1 | Sieving | n/a | 595 | n/a | >595 | 150° C., 2 h | 300 ± 20 | 0.35 | 1.21 |
| DVB-MA-2 | Sieving | n/a | 420 | n/a | 595 | 150° C., 2 h | 300 ± 20 | 0.36 | 1.21 |
| DVB-MA-3 | Sieving | n/a | 250 | n/a | 420 | 150° C., 2 h | 300 ± 20 | 0.32 | 1.21 |
| DVB-MA-4 | Sieving | n/a | <250 | n/a | 250 | 150° C., 2 h | 300 ± 20 | 0.31 | 1.21 |
| Geopolymer | Sieving | n/a | 106 | n/a | 1000 | 200° C., 5 h | 61 | | 2.19 |
| HPX5 | Scattering | 1.80 | 11 | 30 | 120 | 200° C., 5 h | 1470 | 0.23 | |
| LAPONITE RD | Scattering (MEK) | 1.50 | 14 | 70 | 133 | ° C., 5 h | 356 | 1.03 | |
| LAPONITE RD-Agglomerate | Sieving | n/a | 106 | n/a | 1000 | 50° C., 12 h | 287 | 0.70 | 2.21 |
| TC307 | Scattering (MEK) | 2.50 | 3 | 4 | 5 | 200° C., 5 h | 352 | 0.11 | 2.21 |
| TC307-Agglomerate | Sieving | n/a | 106 | n/a | 1000 | 50° C., 12 h | 260 | 0.39 | 1.97 |

The particles (agglomerated and non-agglomerated) underwent Normal Incident Acoustical Absorption testing and the results are represented in Table 4. Sample particles were poured into the vertically mounted tube, which created a 20 mm thick bed of particles except for the CLARCEL 78—Calcined Agglomerate, CLOISITE Na+—Agglomerate, GEOPOLYMER particles. They produced particle bed thicknesses of 15 mm, 15 mm, and 10 mm. The designation "n/a" implies that a peak was not witnessed at the specified frequency.

TABLE 4

Acoustic Performance of Particles

| Particles | α at Initial Maxima | Initial Maxima Frequency (Hz) | Adsorption Onset (Hz) | α 200 Hz | 252 Hz | 316 Hz | 400 Hz | 500 Hz | 632 Hz | 800 Hz | 1000 Hz | 1252 Hz | 1600 Hz |
|---|---|---|---|---|---|---|---|---|---|---|---|---|---|
| A4958 | 0.67 | 322 | 216 | 0.06 | 0.27 | 0.66 | 0.43 | 0.25 | 0.20 | 0.23 | 0.33 | 0.31 | 0.32 |
| A4958-Agglomerate | n/a | n/a | 324 | 0.11 | 0.13 | 0.11 | 0.27 | 0.39 | 0.43 | 0.47 | 0.49 | 0.51 | 0.53 |
| CLARCEL 78, Calcined | 0.77 | 514 | 224 | 0.03 | 0.09 | 0.19 | 0.55 | 0.68 | 0.66 | 0.50 | 0.42 | 0.49 | 0.51 |
| CLARCEL 78, Calcined-Agglomerate | n/a | n/a | 290 | 0.08 | 0.03 | 0.08 | 0.23 | 0.34 | 0.40 | 0.45 | 0.46 | 0.48 | 0.50 |
| CLOISITE Na+ | 0.80 | 282 | 210 | 0.05 | 0.41 | 0.43 | 0.12 | 0.09 | 0.10 | 0.37 | 0.17 | 0.22 | 0.22 |
| CLOISITE Na+-Agglomerate | n/a | n/a | n/a | 0.03 | 0.03 | 0.04 | 0.07 | 0.08 | 0.10 | 0.15 | 0.21 | 0.30 | 0.45 |
| FlexiThix | 0.76 | 432 | 288 | 0.04 | 0.07 | 0.25 | 0.70 | 0.58 | 0.26 | 0.16 | 0.19 | 0.47 | 0.38 |
| Ground Nutshell | 0.35 | 440 | 300 | 0.06 | 0.11 | 0.14 | 0.31 | 0.31 | 0.28 | 0.28 | 0.27 | 0.29 | 0.33 |
| HS-76 | n/a | n/a | <200 | 0.06 | 0.12 | 0.15 | 0.23 | 0.34 | 0.46 | 0.58 | 0.67 | 0.71 | 0.73 |
| iM16K | 0.61 | 748 | 540 | 0.03 | 0.02 | 0.06 | 0.06 | 0.08 | 0.23 | 0.54 | 0.18 | 0.10 | 0.12 |
| iM30K | 0.94 | 432 | 316 | 0.03 | 0.03 | 0.02 | 048 | 0.34 | 0.08 | 0.05 | 0.08 | 0.45 | 0.13 |
| iM30K-Agglomerate | n/a | n/a | 282 | 0.06 | 0.07 | 0.09 | 0.14 | 0.18 | 0.21 | 0.41 | 0.57 | 0.70 | 0.80 |
| Maple (10010) | 0.57 | 400 | 212 | 0.07 | 0.16 | 0.38 | 0.57 | 0.47 | 0.36 | 0.32 | 0.35 | 0.40 | 0.44 |
| MP1004 | 0.57 | 392 | 336 | 0.07 | 0.07 | 0.09 | 0.20 | 0.47 | 0.56 | 0.57 | 0.56 | 0.57 | 0.59 |
| MN4X | 0.57 | 462 | 234 | 0.08 | 0.15 | 0.31 | 0.53 | 0.54 | 0.46 | 0.4.3 | 0.45 | 0.49 | 0.51 |
| Nepheline | 0.51 | 332 | 274 | 0.06 | 0.06 | 0.41 | 0.27 | 0.14 | 0.10 | 0.13 | 0.26 | 0.18 | 0.24 |
| Pine (10020) | n/a | n/a | 220 | 0.07 | 0.13 | 0.20 | 0.33 | 0.45 | 0.56 | 0.61 | 0.64 | 0.65 | 0.66 |
| XG-3 | 0.65 | 490 | 324 | 0.10 | 0.09 | 0.14 | 0.41 | 0.64 | 0.49 | 0.40 | 0.35 | 0.37 | 0.42 |
| Ruby Sand | n/a | n/a | n/a | 0.09 | 0.09 | 0.11 | 0.15 | 0.18 | 0.25 | 0.35 | 0.46 | 0.60 | 0.73 |
| AC 32x60 | | | | 0.39 | 0.41 | 0.44 | 0.47 | 0.58 | 0.62 | 0.62 | 0.64 | 0.65 | 0.68 |
| CYPBRID 1 | 0.86 | 226 | <200 | 0.45 | 0.46 | 0.14 | 0.08 | 0.10 | 0.39 | 0.22 | 0.22 | 0.26 | 0.27 |
| DVB-MA-1 | n/a | n/a | <200 | 0.05 | 0.00 | 0.10 | 0.11 | 0.12 | 0.25 | 0.34 | 0.46 | 0.60 | 0.74 |
| DVB-MA-2 | n/a | n/a | <200 | 0.08 | 0.03 | 0.12 | 0.18 | 0.18 | 0.36 | 0.44 | 0.50 | 0.56 | 0.60 |
| DVB-MA-3 | 0.40 | 480 | <200 | 0.08 | 0.17 | 0.18 | 0.35 | 0.39 | 0.38 | 0.37 | 0.38 | 0.39 | 0.36 |
| DVB-MA-4 | 0.80 | 352 | <200 | 0.12 | 0.00 | 0.40 | 0.38 | 0.28 | 0.07 | 0.12 | 0.38 | 0.18 | 0.23 |
| GEOPOLYMER | n/a | n/a | 650 | 0.05 | 0.03 | 0.06 | 0.08 | 0.08 | 0.10 | 0.18 | 0.22 | 0.27 | 0.34 |
| LAPONITE RD | 0.40 | 450 | 358 | 0.00 | 0.06 | 0.06 | 0.21 | 0.21 | 0.08 | 0.06 | 0.12 | 0.17 | 0.09 |
| LAPONITE RD-Agglomerate | n/a | n/a | 350 | 0.10 | 0.09 | 0.13 | 0.19 | 0.22 | 0.34 | 0.44 | 0.53 | 0.60 | 0.64 |
| TC307 | 0.85 | 428 | 200 | 0.09 | 0.14 | 0.32 | 0.80 | 0.68 | 0.40 | 0.30 | 0.32 | 0.44 | 0.48 |
| TC307-Agglomerate | 0.48 | 364 | 236 | 0.15 | 0.16 | 0.42 | 0.46 | 0.44 | 0.44 | 0.44 | 0.46 | 0.48 | 0.50 |

Examples 1-19 (EX1-EX19) and Comparative Example 1 (CE1)

A nonwoven melt blown web was prepared by a process like that described in Wente, Van A., "Superfine Thermoplastic Fibers" in Industrial Engineering Chemistry, Vol. 48, pages 1342 et seq. (1956), and in Report No. 4364 of the Naval Research Laboratories, published May 25, 1954 entitled "Manufacture of Superfine Organic Fibers" by Wente, Van. A. Boone, C. D., and Fluharty, E. L., except that a drilled die was used to produce the fibers.

MF650Y polypropylene resin was extruded through the die into a high velocity stream of heated air which drew out and attenuated polypropylene blown microfibers prior to their solidification and collection. Particles were fed into the stream of polypropylene blown microfibers, according to the method of U.S. Pat. No. 3,971,373 (Braun). The blend of polypropylene blown microfibers and particles was collected in a random fashion on a nylon belt, affording a polypropylene BMF-web layer loaded with particles. The web was then removed from the nylon belt to provide the final article. Sample constructions made are represented in Table 5. Sample thickness was measured using a thickness testing gauge having a tester foot with dimensions of 5 cm×12.5 cm at an applied pressure of 150 Pa. Air Flow Resistance (AFR) Test 1 was conducted on the samples. Solidity was calculated based on Equation 1. Results are listed in Table 5.

$$\text{Solidity (\%)} = \frac{\text{Particle Volume} + BMF\ \text{Volume}}{\text{Sample Volume}} = \frac{\left(\frac{\text{Weight \% Particles} * \text{Web Weight (g)}}{\text{Particle Density}\left(\frac{g}{m^3}\right)}\right) + \left(\frac{\text{Weight \%}\ BMF * \text{Web Weight (g)}}{\text{Polymer Density}\left(\frac{g}{m^3}\right)}\right)}{\text{Web Thickness (m)} * \text{Web area (m}^2)}$$

TABLE 5

Sample Constructions and Test Results

| | Particle | Basis Weight (gsm) | wt.% Particles | wt. % BMF | Thick-ness (mm) | Pressure Drop (MKS Rayls) | Solid-ity (%) |
|---|---|---|---|---|---|---|---|
| CE1 | None | 100 | 0 | 100 | 1.6 | 540 | 7 |
| EX1 | CLOISITE Na+ | 180 | 40 | 60 | 2.2 | 660 | 12 |
| EX2 | iM30K | 130 | 19 | 81 | 2.0 | 690 | 11 |
| EX3 | iM30K | 200 | 50 | 50 | 2.9 | 850 | 17 |
| EX4 | MP1004 | 130 | 25 | 75 | 3.1 | 610 | 10 |
| EX5 | MP1004 | 250 | 59 | 41 | 5.6 | 640 | 20 |
| EX6 | MP1004 | 340 | 71 | 29 | 7.2 | 660 | 24 |
| EX7 | XG-3 | 150 | 34 | 66 | 1.8 | 560 | 21 |
| EX8 | XG-3 | 260 | 61 | 39 | 3.4 | 800 | 28 |
| EX9 | A4958-Agglomerate | 350 | 70 | 30 | 4.1 | 440 | 27 |

TABLE 5-continued

Sample Constructions and Test Results

| | Particle | Basis Weight (gsm) | wt.% Particles | wt. % BMF | Thick-ness (mm) | Pressure Drop (MKS Rayls) | Solid-ity (%) |
|---|---|---|---|---|---|---|---|
| EX10 | CLOISITE NA+-Agglomerate | 560 | 81 | 19 | 3.9 | 520 | 19 |
| EX11 | iM30K-Agglomerate | 240 | 57 | 43 | 4.1 | 480 | 20 |
| EX12 | DVB-MA-2 | 280 | 64 | 36 | 4.2 | 410 | 14 |
| EX13 | DVB-MA-2 | 520 | 81 | 19 | 6.2 | 360 | 21 |
| EX14 | DVB-MA-3 | 190 | 47 | 53 | 3.3 | 410 | 12 |
| EX15 | DVB-MA-3 | 500 | 80 | 20 | 5.4 | 490 | 25 |
| EX16 | DVB-MA-4 | 160 | 37 | 63 | 2.5 | 470 | 12 |
| EX17 | DVB-MA-4 | 280 | 65 | 35 | 4.4 | 500 | 16 |
| EX18 | LAPONITE RD-Agglomerate | 560 | 81 | 19 | 3.8 | 610 | 20 |
| EX19 | TC307-Agglomerate | 210 | 50 | 50 | 3.2 | 640 | 12 |

The samples underwent Normal Incident Acoustical Absorption testing and the results are represented in Table 6. For the acoustical absorption, sample discs were punched out with a 64-mm diameter punch and mounted between two round, open meshed metal screens (63 mm and 68 mm) set 5 mm apart above a 20-mm air space. The air space was defined by two 10-mm spacer rings (inner diameter 61 mm); the 63-mm metal screen rested on the top spacer ring, 5 mm below the lip of the sample chamber volume, while the 68-mm metal screen rested on the lip of the impedance tube sample volume. The spacers and screens (S&S) contribution to a is also provided in Table 6.

TABLE 6

Acoustic Test Results

| | α | | | | | | | | | | | |
|---|---|---|---|---|---|---|---|---|---|---|---|---|
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| S&S | 0.04 | 0.04 | 0.03 | 0.03 | 0.03 | 0.04 | 0.04 | 0.05 | 0.06 | 0.07 | 0.08 | 0.09 |
| CE1 | 0.06 | 0.05 | 0.07 | 0.09 | 0.09 | 0.18 | 0.20 | 0.40 | 0.57 | 0.81 | 0.94 | 0.99 |
| EX1 | 0.03 | 0.05 | 0.07 | 0.10 | 0.14 | 0.24 | 0.35 | 0.53 | 0.72 | 0.88 | 0.96 | 0.98 |
| EX2 | 0.04 | 0.06 | 0.07 | 0.12 | 0.13 | 0.19 | 0.34 | 0.53 | 0.71 | 0.87 | 0.96 | 0.98 |
| EX3 | 0.05 | 0.07 | 0.08 | 0.13 | 0.18 | 0.29 | 0.46 | 0.66 | 0.82 | 0.91 | 0.94 | 0.93 |
| EX4 | 0.04 | 0.05 | 0.05 | 0.10 | 0.12 | 0.20 | 0.29 | 0.43 | 0.59 | 0.77 | 0.90 | 0.98 |
| EX5 | 0.06 | 0.08 | 0.08 | 0.13 | 0.17 | 0.25 | 0.36 | 0.49 | 0.63 | 0.79 | 0.91 | 0.98 |
| EX6 | 0.06 | 0.07 | 0.09 | 0.14 | 0.18 | 0.25 | 0.38 | 0.52 | 0.66 | 0.82 | 0.93 | 0.99 |
| EX7 | 0.04 | 0.06 | 0.06 | 0.09 | 0.14 | 0.21 | 0.35 | 0.52 | 0.72 | 0.88 | 0.97 | 0.99 |
| EX8 | 0.06 | 0.09 | 0.10 | 0.15 | 0.23 | 0.38 | 0.57 | 0.75 | 0.86 | 0.90 | 0.89 | 0.85 |
| EX9 | 0.03 | 0.06 | 0.09 | 0.12 | 0.14 | 0.24 | 0.35 | 0.49 | 0.65 | 0.81 | 0.92 | 0.98 |
| EX10 | 0.05 | 0.08 | 0.10 | 0.15 | 0.19 | 0.29 | 0.40 | 0.54 | 0.69 | 0.83 | 0.92 | 0.97 |
| EX11 | 0.06 | 0.07 | 0.09 | 0.13 | 0.17 | 0.28 | 0.40 | 0.56 | 0.71 | 0.86 | 0.94 | 0.98 |
| EX12 | 0.05 | 0.07 | 0.08 | 0.12 | 0.16 | 0.23 | 0.34 | 0.47 | 0.62 | 0.78 | 0.90 | 0.98 |
| EX13 | 0.06 | 0.09 | 0.10 | 0.15 | 0.18 | 0.27 | 0.39 | 0.53 | 0.68 | 0.83 | 0.94 | 0.99 |
| EX14 | 0.05 | 0.07 | 0.07 | 0.11 | 0.14 | 0.22 | 0.32 | 0.48 | 0.64 | 0.81 | 0.92 | 0.98 |
| EX15 | 0.07 | 0.10 | 0.11 | 0.15 | 0.21 | 0.31 | 0.43 | 0.56 | 0.69 | 0.84 | 0.94 | 0.98 |
| EX16 | 0.05 | 0.05 | 0.07 | 0.10 | 0.13 | 0.23 | 0.35 | 0.50 | 0.67 | 0.83 | 0.93 | 0.98 |
| EX17 | 0.06 | 0.06 | 0.08 | 0.12 | 0.18 | 0.26 | 0.39 | 0.54 | 0.69 | 0.84 | 0.93 | 0.98 |
| EX18 | 0.05 | 0.07 | 0.09 | 0.12 | 0.15 | 0.27 | 0.37 | 0.54 | 0.73 | 0.87 | 0.93 | 0.94 |
| EX19 | 0.05 | 0.08 | 0.10 | 0.13 | 0.19 | 0.29 | 0.40 | 0.55 | 0.70 | 0.83 | 0.91 | 0.96 |

Examples 20-21 (EX20-EX21)

Two samples of greater thickness, loaded with MP1004, were prepared according to the method described for Examples 1-20. Sample constructions made, solidity percentages, and results of the Air Flow Resistance (AFR) Test 2 are represented in Table 7.

TABLE 7

| Sample Constructions and Test Results | | | | | | | |
|---|---|---|---|---|---|---|---|
| | Particle | Thickness (mm) | Basis Wt. (gsm) | wt. % Particles | wt. % BMF | Air Flow Resistance (MKS Rayls) | Solidity (%) |
| EX20 | MP1004 | 11.3 | 560 | 40 | 60 | 1400 | 16 |
| EX21 | MP1004 | 11.0 | 560 | 60 | 40 | 720 | 23 |

The samples underwent Normal Incident Acoustical Absorption testing and the results are represented in Table 8. For the acoustical absorption, sample discs were punched out with a 64-mm diameter punch and placed directly into a sample chamber set to a 15-mm gap height.

TABLE 8

| Acoustic Test Results | | | | | | | | | | | | |
|---|---|---|---|---|---|---|---|---|---|---|---|---|
| | α | | | | | | | | | | | |
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| EX20 | 0.06 | 0.07 | 0.08 | 0.11 | 0.15 | 0.22 | 0.33 | 0.46 | 0.61 | 0.76 | 0.86 | 0.93 |
| EX21 | 0.05 | 0.05 | 0.06 | 0.09 | 0.11 | 0.17 | 0.24 | 0.34 | 0.46 | 0.61 | 0.75 | 0.87 |

Examples 22-28 (EX22-EX28) and Comparative Example 2 (CE2)

Examples were prepared from webs produced by meltblowing 3860X resin heated to 230 degrees C. extruded at a rate of 0.30 grams per hole per minute into sonic speed heated air at 320 degrees C. with an air flow of 9.26 Cubic meters per minute. The collector consisted of a 76 cm diameter drum and a 25 cm diameter drum spaced 1 cm apart with a surface speed of 254 cm/minute for each drum. The drums were run with an in running nip and were clothed with an 80% open area and punched with 3 mm staggered holes.

The die exit to the gap between the drums was 43 cm and the fibers were centered on the gap. A web of 106 grams per $cm^2$ with a web thickness of 18.1 mm and an effective fiber diameter of 7.7 micrometers was produced. The web had one side that had pores with diameters below 40 micrometers and the other side corresponding to the smaller drum had diameter pores over 300 micrometers.

The web was rolled onto a flat surface and sample discs of the BMF nonwoven were punched out with a 64-mm diameter punch and ~0.2-0.3-gram particles were placed onto the BMF surface. The samples were then loaded onto a shaker table for 1 minute and a final mass was taken to account for particles that were shaken off. Sample constructions are represented in Table 9. Air Flow Resistance (AFR) Test 2 was conducted after the acoustic measurement was performed and the results are represented in Table 9. Some particles were displaced during the pressure drop measurement, so the measurement is assumed to be a lower bound on the potential pressure drop.

TABLE 9

| Sample Constructions and Test Results | | | | |
|---|---|---|---|---|
| | Particles | Composite Basis Wt (gsm) | wt. % Particles | Air Flow Resistance (MKS Rayls) |
| CE2 | None | 120 | 0 | 960 |
| EX22 | FlexiThix | 190 | 28 | 1200 |
| EX23 | Maple (10010) | 140 | 31 | 990 |
| EX24 | Nepheline | 190 | 29 | 960 |
| EX25 | Pine (10020) | 170 | 24 | 930 |
| EX26 | CLARCEL 78-Agglomerated | 140 | 26 | 1000 |
| EX27 | GEOPOLYMER | 170 | 33 | 980 |
| EX28 | Ruby Sand | 160 | 26 | 900 |

The samples underwent Normal Incident Acoustical Absorption testing and the results are represented in Table 10 except that only one sample was tested.

TABLE 10

| Acoustic Test Results | | | | | | | | | | | | |
|---|---|---|---|---|---|---|---|---|---|---|---|---|
| | α | | | | | | | | | | | |
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE2 | 0.05 | 0.09 | 0.12 | 0.13 | 0.21 | 0.24 | 0.29 | 0.41 | 0.58 | 0.86 | 0.99 | 0.98 |
| EX22 | 0.03 | 0.06 | 0.07 | 0.13 | 0.13 | 0.33 | 0.59 | 0.77 | 0.79 | 0.91 | 1.00 | 0.92 |
| EX23 | 0.04 | 0.06 | 0.08 | 0.14 | 0.17 | 0.32 | 0.39 | 0.46 | 0.60 | 0.83 | 0.99 | 0.98 |
| EX24 | 0.04 | 0.07 | 0.08 | 0.15 | 0.14 | 0.31 | 0.50 | 0.59 | 0.60 | 0.83 | 0.99 | 0.97 |
| EX25 | 0.07 | 0.10 | 0.13 | 0.19 | 0.18 | 0.36 | 0.44 | 0.50 | 0.56 | 0.78 | 0.96 | 0.98 |
| EX26 | 0.07 | 0.07 | 0.13 | 0.18 | 0.17 | 0.24 | 0.34 | 0.43 | 0.58 | 0.85 | 0.99 | 0.97 |
| EX27 | 0.06 | 0.05 | 0.11 | 0.18 | 0.24 | 0.27 | 0.40 | 0.45 | 0.57 | 0.80 | 0.98 | 0.98 |
| EX28 | 0.06 | 0.05 | 0.11 | 0.18 | 0.21 | 0.24 | 0.38 | 0.40 | 0.56 | 0.81 | 0.99 | 0.98 |

Examples 29-34 (EX29-EX34) and Comparative Examples 3-12 (CE3-CE 12)

Shoddy material (Janesville Acoustics, Southfield, MI) was physically separated into discreet fibers using a Rando Reclaim Shredder Model RRS 36 available from Rando Machine Corporation Macedon, NY with feed roll setting at 152.4 millimeter per minute (0.5 feet per minute) and the main Cylinder set at 500 RPM. The opened fibers had any remaining unopened clumps manually removed. 400 grams of opened fiber were combined with 100 grams of 2d Melty PET/PET Bi-component (Length: 38 mm, 2.0 denier) produced by Huvis (Seoul, South Korea) and 100 grams of sample particulates. These mixtures were produced into webs following the procedure outlined in Example 1 of U.S. Pat. No. 9,580,848 (Henderson et al) on top of a scrim (obtained as "10.5 #CARRIER TISSUE, GRADE 3533" from Little Rapids Corporation, Milwaukee, WI). Sample constructions and the results of Air Flow Resistance (AFR) Test 2 are represented in Table 11.

TABLE 11

| Sample Constructions and Test Results | | | | | | |
|---|---|---|---|---|---|---|
| | Particles | Basis Wt with Scrim (gsm) | Basis Wt with Scrim Removed (gsm) | Scrim Removed Thickness (mm) | AFR With Scrim (MKS Rayls) | AFR Scrim Removed (MKS Rayls) |
| CE3-CE4<br>CE7<br>CE11 | None | 650 ± 40 | DNR | 7-9 | 190 ± 30 | DNT |
| CES-CE6<br>CE9-CE10<br>CE12 | AC 32 × 60 | 560 | 540 | 7-9 | 290 | 230 |
| EX29-34 | XG-3 | 650 | 630 | 7-9 | 1100 | 930 |

For CE3, CE4, CE7, and CE11, the scrim was too firmly affixed to the sample and could not be removed (DNR—did not remove) and thus Air Flow Resistance (AFR) Test 2 could not be conducted (DNT—did not test).

The samples underwent Normal Incident Acoustical Absorption testing. For the acoustical absorption, sample discs were punched out with a 64-mm diameter punch and placed directly into a sample chamber set to a 7 mm gap height.

For one format of Normal Incident Acoustical Absorption testing, sample discs were punched out with a 64 mm diameter punch and placed directly into a sample chamber set to a 7 mm gap height. Measurements were taken with both 1) scrim-side-up and 2) scrim removed (in the case of AC 32×60 and XG-3) or scrim-side-down (in the control case, where the scrim was well-adhered). Results are represented in Table 12.

TABLE 12

Acoustic Test Results

| | | α | | | | | | | | | | | |
|---|---|---|---|---|---|---|---|---|---|---|---|---|---|
| | Scrim Position | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE3 | Up | 0.05 | 0.04 | 0.02 | 0.04 | 0.04 | 0.06 | 0.07 | 0.09 | 0.11 | 0.15 | 0.19 | 0.25 |
| CE4 | Down | 0.05 | 0.04 | 0.02 | 0.03 | 0.04 | 0.05 | 0.07 | 0.09 | 0.11 | 0.14 | 0.19 | 0.25 |
| CE5 | Up | 0.05 | 0.05 | 0.03 | 0.05 | 0.06 | 0.08 | 0.10 | 0.12 | 0.15 | 0.20 | 0.28 | 0.36 |
| CE6 | None | 0.06 | 0.05 | 0.03 | 0.05 | 0.06 | 0.07 | 0.09 | 0.11 | 0.13 | 0.17 | 0.22 | 0.29 |
| EX29 | Up | 0.06 | 0.05 | 0.03 | 0.06 | 0.08 | 0.10 | 0.14 | 0.18 | 0.24 | 0.35 | 0.47 | 0.60 |
| EX30 | None | 0.05 | 0.05 | 0.03 | 0.05 | 0.06 | 0.08 | 0.11 | 0.14 | 0.19 | 0.27 | 0.38 | 0.50 |

In another configuration of Normal Incident Acoustical Absorption testing, disc samples were punched out with a 68 mm punch and set onto a 68 mm wire mesh circle over a 20 mm gap. Scrims were removed from the AC 32×60 and XG-3 samples prior to measurement, while the control (particles=none) sample was tested with the scrim side facing down. Results are recorded in Table 13.

TABLE 13

Acoustic Test Results

| | | α | | | | | | | | | | | |
|---|---|---|---|---|---|---|---|---|---|---|---|---|---|
| | Scrim Position | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE7 | Down | 0.06 | 0.06 | 0.07 | 0.10 | 0.14 | 0.20 | 0.28 | 0.39 | 0.53 | 0.69 | 0.83 | 0.92 |
| CE8 | None | 0.06 | 0.06 | 0.09 | 0.12 | 0.16 | 0.22 | 0.31 | 0.42 | 0.55 | 0.71 | 0.82 | 0.86 |
| EX31 | None | 0.11 | 0.10 | 0.12 | 0.14 | 0.21 | 0.36 | 0.48 | 0.60 | 0.77 | 0.89 | 0.95 | 0.97 |

In yet another configuration of Normal Incident Acoustical Absorption testing, the samples with particles were tested in 2- and 3-layer stacks directly in the sample chamber. Test gap height were 18 mm for CE9, 24 mm for CE10, 15 mm for EX32, and 20 mm for EX33. Test results are recorded in Table 14.

TABLE 14

Acoustic Test Results

| | Number of | α | | | | | | | | | | | |
|---|---|---|---|---|---|---|---|---|---|---|---|---|---|
| | Layers | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE9 | 2 | 0.07 | 0.06 | 0.07 | 0.09 | 0.11 | 0.13 | 0.17 | 0.21 | 0.26 | 0.34 | 0.44 | 0.55 |
| CE10 | 3 | 0.08 | 0.09 | 0.11 | 0.13 | 0.16 | 0.21 | 0.27 | 0.34 | 0.44 | 0.56 | 0.68 | 0.79 |
| EX32 | 2 | 0.06 | 0.03 | 0.08 | 0.14 | 0.21 | 0.29 | 0.43 | 0.55 | 0.66 | 0.77 | 0.82 | 0.84 |
| EX33 | 3 | 0.12 | 0.02 | 0.15 | 0.30 | 0.48 | 0.58 | 0.67 | 0.75 | 0.77 | 0.76 | 0.74 | 0.73 |

The samples were also tested for sound absorption according to SAE J2883 "Laboratory Measurement of Random Incidence Sound Absorption Tests Using a Small Reverberation Room". The instrument used was an "ALPHA CABIN" obtained from Autoneum, Winterthur, Switzerland. In the test, 1.20 $m^2$ of material was used in a 10 mm frame at 22° C. and 55% humidity. Test results are represented in Table 15. In CE11, the sample was tested was scrim positioned upward. For CE12 and EX34, a scrim was positioned upward and then removed prior to testing.

TABLE 15

Acoustic Test Results

| Frequency [Hz] | CE11 α | CE12 α | EX34 α |
|---|---|---|---|
| 400 | 0.07 | 0.12 | 0.12 |
| 500 | 0.13 | 0.20 | 0.19 |
| 630 | 0.20 | 0.28 | 0.28 |
| 800 | 0.21 | 0.29 | 0.31 |
| 1000 | 0.27 | 0.38 | 0.41 |
| 1250 | 0.34 | 0.45 | 0.50 |
| 1600 | 0.40 | 0.52 | 0.59 |
| 2000 | 0.50 | 0.60 | 0.70 |
| 2500 | 0.56 | 0.68 | 0.80 |
| 3150 | 0.61 | 0.72 | 0.83 |
| 4000 | 0.69 | 0.79 | 0.88 |
| 5000 | 0.73 | 0.83 | 0.90 |
| 6300 | 0.79 | 0.86 | 0.94 |
| 8000 | 0.86 | 0.91 | 0.96 |
| 10000 | 0.87 | 0.89 | 0.94 |

Examples 35-56 (EX35-EX56) and Comparative Examples 13-17 (CE13-CE19)

A 64-mm punch was used to cut disks out of the CE3 shoddy non-woven web. These disks were weighed, and then loaded with particles by manually rubbing the particles into the non-scrim surface of the nonwoven disk. Once the surface was completely suffused with particles, the disks were agitated to remove excess and re-weighed. For normal incident acoustic absorption, the samples were loaded in the testing tube with the particle-loaded surface facing upward. A 7-mm depth was used for the sample chamber, which was completely occupied by the given disk. Results are represented in Table 16. Air Flow Resistance (AFR) Test 1 results were recorded after the acoustic measurement and are represented in Table 16.

TABLE 16

Sample Constructions and Test Results

| | Particles | Composite Basis Wt. (gsm) | wt. % Particles | Air Flow Resistance (MKS Rayls) |
|---|---|---|---|---|
| CE13 | None | 650 ± 40 | 0 | 190 ± 30 |
| EX35 | A4958 | 730 | 8 | 250 |
| EX36 | A4958 | 850 | 18 | 380 |
| EX37 | CLOISITE Na+ | 820 | 18 | 210 |
| EX38 | CLOISITE Na+ | 780 | 20 | 200 |
| EX39 | CLARCEL 78 | 770 | 11 | 600 |
| EX40 | CLARCEL 78 | 700 | 11 | 800 |
| EX41 | iM16K | 840 | 21 | 200 |
| EX42 | iM16K | 770 | 19 | 170 |
| EX43 | Maple (10010) | 850 | 15 | 240 |
| EX44 | Maple (10010) | 900 | 24 | 240 |
| EX45 | Nepheline | 980 | 31 | 480 |
| EX46 | Nepheline | 980 | 35 | 700 |
| EX47 | Pine (10020) | 750 | 17 | 280 |
| EX48 | Pine (10020) | 760 | 14 | 280 |
| EX49 | MP1004 | 680 | 11 | 170 |
| EX50 | MP1004 | 710 | 11 | 170 |
| EX51 | FlexiThix/CLARCEL 78 | 710 | 12 | 370 |
| EX52 | FlexiThix/CLARCEL 78 | 660 | 12 | 490 |
| EX53 | DVB-MA-4 | 700 | 13 | 160 |
| EX54 | DVB-MA-4 | 690 | 13 | 150 |
| EX55 | LAPONITE RD-Agglomerate | 750 | 20 | 210 |
| EX56 | LAPONITE RD-Agglomerate | 740 | 18 | 200 |
| CE14 | CYPBRID 1 | 810 | 15 | 220 |
| CE15 | CYPBRID 1 | 800 | 24 | 200 |
| CE16 | HPX5 | 680 | 11 | 190 |
| CE17 | HPX5 | 690 | 13 | 150 |
| CE18 | LAPONITE RD | 830 | 19 | 220 |
| CE19 | LAPONITE RD | 880 | 31 | 180 |

The samples underwent Normal Incident Acoustical Absorption testing with the sample discs placed directly into a sample chamber set to a 7-mm gap height. The results are represented in Table 17.

TABLE 17

Acoustic Test Results

| | α | | | | | | | | | | | |
|---|---|---|---|---|---|---|---|---|---|---|---|---|
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE13 | 0.04 | 0.03 | 0.04 | 0.04 | 0.05 | 0.06 | 0.07 | 0.09 | 0.11 | 0.14 | 0.18 | 0.24 |
| EX35 | 0.04 | 0.06 | 0.03 | 0.03 | 0.04 | 0.06 | 0.08 | 0.10 | 0.14 | 0.20 | 0.28 | 0.41 |
| EX36 | 0.06 | 0.07 | 0.04 | 0.05 | 0.07 | 0.10 | 0.14 | 0.18 | 0.23 | 0.36 | 0.51 | 0.68 |
| EX37 | 0.03 | 0.07 | 0.04 | 0.06 | 0.07 | 0.10 | 0.13 | 0.17 | 0.20 | 0.27 | 0.37 | 0.52 |
| EX38 | 0.03 | 0.07 | 0.05 | 0.06 | 0.07 | 0.09 | 0.12 | 0.16 | 0.19 | 0.25 | 0.34 | 0.50 |
| EX39 | 0.06 | 0.09 | 0.05 | 0.04 | 0.08 | 0.12 | 0.19 | 0.24 | 0.30 | 0.42 | 0.63 | 0.83 |
| EX40 | 0.05 | 0.09 | 0.04 | 0.04 | 0.06 | 0.09 | 0.12 | 0.15 | 0.19 | 0.31 | 0.47 | 0.69 |
| EX41 | 0.02 | 0.06 | 0.03 | 0.05 | 0.06 | 0.08 | 0.11 | 0.14 | 0.18 | 0.25 | 0.37 | 0.52 |
| EX42 | 0.03 | 0.05 | 0.03 | 0.04 | 0.06 | 0.08 | 0.11 | 0.16 | 0.22 | 0.32 | 0.47 | 0.67 |
| EX43 | 0.02 | 0.04 | 0.04 | 0.04 | 0.05 | 0.07 | 0.09 | 0.11 | 0.15 | 0.21 | 0.29 | 0.39 |
| EX44 | 0.02 | 0.05 | 0.04 | 0.05 | 0.07 | 0.09 | 0.12 | 0.15 | 0.20 | 0.29 | 0.40 | 0.53 |
| EX45 | 0.05 | 0.08 | 0.04 | 0.05 | 0.06 | 0.09 | 0.12 | 0.16 | 0.23 | 0.35 | 0.51 | 0.69 |
| EX46 | 0.05 | 0.09 | 0.05 | 0.05 | 0.07 | 0.09 | 0.13 | 0.18 | 0.24 | 0.38 | 0.57 | 0.77 |
| EX47 | 0.02 | 0.06 | 0.05 | 0.05 | 0.07 | 0.09 | 0.12 | 0.15 | 0.18 | 0.24 | 0.32 | 0.42 |
| EX48 | 0.03 | 0.05 | 0.04 | 0.05 | 0.07 | 0.09 | 0.11 | 0.13 | 0.17 | 0.22 | 0.30 | 0.40 |

TABLE 17-continued

| Acoustic Test Results | | | | | | | | | | | | |
|---|---|---|---|---|---|---|---|---|---|---|---|---|
| | α | | | | | | | | | | | |
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| EX49 | 0.05 | 0.02 | 0.04 | 0.04 | 0.06 | 0.08 | 0.10 | 0.13 | 0.17 | 0.22 | 0.28 | 0.37 |
| EX50 | 0.04 | 0.03 | 0.04 | 0.04 | 0.06 | 0.08 | 0.10 | 0.13 | 0.17 | 0.21 | 0.27 | 0.34 |
| EX51 | 0.01 | 0.06 | 0.03 | 0.04 | 0.05 | 0.08 | 0.11 | 0.14 | 0.22 | 0.32 | 0.47 | 0.70 |
| EX52 | 0.02 | 0.05 | 0.04 | 0.05 | 0.07 | 0.08 | 0.11 | 0.14 | 0.16 | 0.24 | 0.35 | 0.52 |
| EX53 | 0.03 | 0.01 | 0.03 | 0.03 | 0.04 | 0.05 | 0.07 | 0.09 | 0.12 | 0.16 | 0.22 | 0.31 |
| EX54 | 0.03 | 0.02 | 0.03 | 0.03 | 0.04 | 0.05 | 0.07 | 0.08 | 0.10 | 0.14 | 0.18 | 0.25 |
| EX55 | 0.04 | 0.01 | 0.04 | 0.05 | 0.05 | 0.06 | 0.07 | 0.09 | 0.11 | 0.15 | 0.19 | 0.25 |
| EX56 | 0.05 | 0.01 | 0.05 | 0.06 | 0.07 | 0.08 | 0.11 | 0.14 | 0.16 | 0.19 | 0.24 | 0.33 |
| CE14 | 0.03 | 0.02 | 0.04 | 0.03 | 0.06 | 0.07 | 0.09 | 0.12 | 0.17 | 0.25 | 0.36 | 0.50 |
| CE15 | 0.03 | 0.02 | 0.03 | 0.04 | 0.05 | 0.07 | 0.10 | 0.14 | 0.19 | 0.30 | 0.44 | 0.63 |
| CE16 | 0.03 | 0.00 | 0.03 | 0.03 | 0.05 | 0.06 | 0.08 | 0.11 | 0.15 | 0.21 | 0.29 | 0.42 |
| CE17 | 0.03 | 0.00 | 0.03 | 0.03 | 0.05 | 0.07 | 0.09 | 0.12 | 0.16 | 0.23 | 0.32 | 0.46 |
| CE18 | 0.06 | 0.00 | 0.03 | 0.04 | 0.04 | 0.05 | 0.07 | 0.09 | 0.11 | 0.15 | 0.19 | 0.26 |
| CE19 | 0.06 | 0.00 | 0.03 | 0.04 | 0.04 | 0.05 | 0.07 | 0.09 | 0.12 | 0.16 | 0.21 | 0.30 |

Examples 57-58 (EX57-EX58) and Comparative Example 20 (CE20)

2.54 cm (1 inch) thick polyester acoustical absorbing foam (obtained under the trade designation "J81 Tufcote" from AEARO Technologies, Indianapolis, IN) was used as the base substrate. Sample discs were punched out with a 64-mm diameter punch and the skin layer was removed from both surfaces of the disc using a razor. To each disc, 0.3 g particles were spread across the surface by hand. Sample constructions and the results of Air Flow Resistance (AFR) Test 2 are represented in Table 18.

TABLE 18

| Sample Constructions and Test Results | | | | |
|---|---|---|---|---|
| | Particle | Basis Wt (gsm) | wt. % Particles | Air Flow Resistance (MKS Rayls) |
| CE20 | None | 750 | 0 | 2300 |
| EX57 | MP1004 | 850 | 12 | 3800 |
| EX58 | CLARCEL 78 | 850 | 12 | 3100 |

The samples underwent Normal Incident Acoustical Absorption testing with the sample discs placed directly into a sample chamber set to a 20-mm gap height. The results are represented in Table 19. Only one sample was tested for each particle.

TABLE 19

| Acoustic Test Results | | | | | | | | | | | | |
|---|---|---|---|---|---|---|---|---|---|---|---|---|
| | α | | | | | | | | | | | |
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE20 | 0.08 | 0.08 | 0.07 | 0.10 | 0.12 | 0.16 | 0.24 | 0.36 | 0.55 | 0.83 | 0.98 | 0.95 |
| EX57 | 0.11 | 0.10 | 0.09 | 0.13 | 0.18 | 0.26 | 0.38 | 0.56 | 0.79 | 0.98 | 0.97 | 0.84 |
| EX58 | 0.08 | 0.09 | 0.09 | 0.12 | 0.16 | 0.24 | 0.35 | 0.55 | 0.78 | 0.99 | 0.95 | 0.79 |

Example 59 (EX59) and Comparative Examples 21-22 (CE21-22)

Fiberglass material (obtained from the hood liner of a 2018 Honda Odyssey Elite) was used as the base substrate. The scrim was removed from either side and sample discs were punched out with a 64-mm diameter punch. To each disc, 0.3 g particles were spread across the surface by hand. Sample constructions and the results of Air Flow Resistance (AFR) Test 2 are represented in Table 20. Only one sample was tested for each particle.

TABLE 20

Sample Constructions and Test Results

| | Particle | Basis Wt (gsm) | wt. % Particles | AFR Pressure drop (MKS Rayls) |
|---|---|---|---|---|
| CE21 | None | 560 | 0 | 260 |
| EX59 | CLARCEL 78 | 660 | 15 | 300 |
| CE22 | CYPBRID 1 | 660 | 15 | 230 |

The samples underwent Normal Incident Acoustical Absorption testing with the sample discs placed directly into a sample chamber set to a 20 mm gap height. The results are represented in Table 21.

TABLE 21

Acoustic Test Results

| | α | | | | | | | | | | | |
|---|---|---|---|---|---|---|---|---|---|---|---|---|
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE21 | 0.06 | 0.08 | 0.09 | 0.11 | 0.13 | 0.16 | 0.20 | 0.25 | 0.31 | 0.39 | 0.48 | 0.58 |
| EX59 | 0.06 | 0.09 | 0.08 | 0.12 | 0.16 | 0.22 | 0.30 | 0.41 | 0.55 | 0.72 | 0.86 | 0.95 |
| CE22 | 0.06 | 0.08 | 0.08 | 0.11 | 0.14 | 0.17 | 0.22 | 0.29 | 0.37 | 0.49 | 0.62 | 0.75 |

Examples 60-93 (EX60-EX93) and Comparative Examples 23-26 (CE23-CE26)

Microperforated films were prepared as described in U.S. Pat. No. 6,617,002 (Wood). For MF-1, a film-grade polypropylene resin PP-1 was used in extrusion of a polypropylene film (1.5 mm thickness) with a black masterbatch (PP3019, obtained from RTP Company of Winona, MN United States) added at 3 wt. %. For MF-2, a film-grade polypropylene resin PP-1 was used in extrusion of a polypropylene film (0.52 mm thickness) with a red masterbatch (199X141358SS-57495, obtained from RTP Company) added. The films were embossed, and heat treated so that the embossing created apertures. Aperture geometries were drawn as described in co-pending International Patent Application No. PCT/US18/56671 (Lee et al), filed on Oct. 19, 2018. The dimensions of the apertures, recorded as average values in micrometers (μm), are listed in Table 22.

TABLE 22

Microperforated Film Aperture Dimensions

| | $H_t$ (μm) | $H_b$ (μm) | $W_t$ (μm) | $W_b$ (μm) | T (μm) | Hole Density (holes/cm$^2$) |
|---|---|---|---|---|---|---|
| MF-1 | 1900 | 300 | 600 | 260 | 1500 | 65 |
| MF-2 | 600 | 130 | 200 | 80 | 520 | 630 |

Sample discs were punched out with a 68 mm diameter punch. For each disc, particles were spread into the larger-aperture side by hand, attempting to fill the apertures. Sample constructions and the results of Air Flow Resistance (AFR) Test 1 for some of the samples are represented in Table 23. (DNT=did not test).

TABLE 23

Sample Constructions and Test Results

| | Sub-strate | Particle | Composite Basis Wt (GSM) | wt. % Particles | AFR Pressure drop (MKS Rayls) |
|---|---|---|---|---|---|
| CE23-CE24 | MF-1 | None | 930 ± 5 | 0 | 40 |
| EX60-EX61 | MF-1 | A4958 Agglomerate | 1120 | 17 | DNT |
| EX62-EX63 | MF-1 | A4958 | 1070 | 13 | DNT |
| EX64-EX65 | MF-1 | MP1004 | 1000 | 7 | 360 |
| EX66-EX67 | MF-1 | CLARCEL 78, Calcined | 990 | 6 | DNT |
| EX68-EX69 | MF-1 | CLOISITE Na+ | 1070 | 13 | DNT |
| EX70-EX71 | MF-1 | DVB-MA-1 | 1090 | 15 | DNT |

TABLE 23-continued

| Sample Constructions and Test Results | | | | | | |
|---|---|---|---|---|---|---|
| | Sub-strate | Particle | Composite Basis Wt (GSM) | wt. % Particles | AFR Pressure drop (MKS Rayls) |
| EX72-EX73 | MF-1 | DVB-MA-2 | 1060 | 12 | DNT |
| EX74-EX75 | MF-1 | DVB-MA-3 | 1070 | 13 | DNT |
| EX76-EX77 | MF-1 | DVB-MA-4 | 1120 | 17 | DNT |
| EX78 | MF-1 | LAPONITE RD-Agglomerate | 1210 | 23 | DNT |
| EX79 | MF-1 | LAPONITE RD-Agglomerate | 1250 | 26 | DNT |
| EX80 | MF-1 | TC307-Agglomerate | 1060 | 12 | DNT |
| EX81 | MF-1 | TC307-Agglomerate | 1080 | 14 | DNT |
| CE25-CE26 | MF-2 | None | 314 ± 1 | 0 | 100 |
| EX82-EX83 | MF-2 | A4958 | 350 | 10 | DNT |
| EX84 | MF-2 | CLOISITE Na+ | 370 | 15 | DNT |
| EX85 | MF-2 | CLOISITE Na+ | 370 | 14 | DNT |
| EX86 | MF-2 | CLARCEL 78 | 350 | 10 | 960 |
| EX87 | MF-2 | CLARCEL 78 | 350 | 10 | 960 |
| EX88 | MF-2 | Maple (10010) | 350 | 11 | DNT |
| EX89 | MF-2 | Maple (10010) | 340 | 8 | DNT |
| EX90 | MF-2 | FlexiThix | 350 | 11 | DNT |
| EX91 | MF-2 | FlexiThix | 360 | 13 | DNT |
| EX92 | MF-2 | Neptheline | 510 | 39 | DNT |
| EX93 | MF-2 | Neptheline | 500 | 38 | DNT |

The samples underwent Normal Incident Acoustical Absorption testing with the sample discs placed directly over a 68-mm metal screen resting on the lip of the sample chamber set to a 20-mm gap height. In cases where a single composite construction was reported, the composite was measured once, the particles were shaken out, and then the same particles were introduced into the same microperforated film for a second acoustic measurement. In cases where two composite constructions are reported, two sets of particles and films were measured. The results were not averaged. The results for MF-1 are represented in Table 24 and the results for MF-2 are represented in Table 25.

TABLE 24

Test Results on MF-1

| | α | | | | | | | | | | | |
|---|---|---|---|---|---|---|---|---|---|---|---|---|
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE23 | 0.04 | 0.03 | 0.04 | 0.05 | 0.05 | 0.07 | 0.09 | 0.13 | 0.20 | 0.30 | 0.43 | 0.50 |
| CE24 | 0.04 | 0.03 | 0.03 | 0.03 | 0.05 | 0.07 | 0.10 | 0.15 | 0.23 | 0.37 | 0.51 | 0.58 |
| EX60 | 0.07 | 0.12 | 0.18 | 0.28 | 0.28 | 0.37 | 0.74 | 0.85 | 0.77 | 0.73 | 0.62 | 0.55 |
| EX61 | 0.07 | 0.09 | 0.12 | 0.16 | 0.13 | 0.38 | 0.58 | 0.76 | 0.88 | 0.91 | 0.87 | 0.79 |
| EX62 | 0.12 | 0.16 | 0.22 | 0.27 | 0.25 | 0.63 | 0.78 | 0.58 | 0.45 | 0.35 | 0.32 | 0.28 |
| EX63 | 0.10 | 0.14 | 0.19 | 0.26 | 0.27 | 0.53 | 0.81 | 0.68 | 0.55 | 0.44 | 0.40 | 0.36 |
| EX64 | 0.05 | 0.08 | 0.09 | 0.14 | 0.18 | 0.26 | 0.48 | 0.70 | 0.88 | 0.97 | 0.95 | 0.87 |
| EX65 | 0.06 | 0.09 | 0.12 | 0.19 | 0.24 | 0.31 | 0.60 | 0.78 | 0.88 | 0.89 | 0.85 | 0.80 |
| EX66 | 0.11 | 0.14 | 0.19 | 0.28 | 0.33 | 0.30 | 0.87 | 0.82 | 0.65 | 0.49 | 0.39 | 0.36 |
| EX67 | 0.07 | 0.10 | 0.12 | 0.18 | 0.22 | 0.32 | 0.61 | 0.86 | 0.96 | 0.85 | 0.70 | 0.56 |
| EX68 | 0.06 | 0.08 | 0.12 | 0.24 | 0.32 | 0.30 | 0.77 | 0.99 | 0.78 | 0.53 | 0.38 | 0.26 |
| EX69 | 0.09 | 0.07 | 0.07 | 0.18 | 0.41 | 0.76 | 0.91 | 0.78 | 0.62 | 0.44 | 0.30 | 0.25 |
| EX70 | 0.03 | 0.04 | 0.05 | 0.07 | 0.07 | 0.12 | 0.19 | 0.30 | 0.48 | 0.72 | 0.87 | 0.88 |
| EX71 | 0.03 | 0.05 | 0.05 | 0.06 | 0.08 | 0.12 | 0.18 | 0.29 | 0.45 | 0.68 | 0.84 | 0.85 |
| EX72 | 0.06 | 0.07 | 0.09 | 0.13 | 0.12 | 0.25 | 0.40 | 0.58 | 0.78 | 0.95 | 1.00 | 0.93 |
| EX73 | 0.05 | 0.06 | 0.07 | 0.11 | 0.15 | 0.18 | 0.33 | 0.51 | 0.73 | 0.94 | 0.99 | 0.90 |
| EX74 | 0.10 | 0.15 | 0.15 | 0.14 | 0.32 | 0.58 | 0.66 | 0.70 | 0.70 | 0.71 | 0.71 | 0.63 |
| EX75 | 0.10 | 0.13 | 0.16 | 0.18 | 0.17 | 0.59 | 0.67 | 0.70 | 0.70 | 0.69 | 0.67 | 0.62 |
| EX76 | 0.05 | 0.06 | 0.06 | 0.08 | 0.12 | 0.13 | 0.28 | 0.38 | 0.68 | 0.81 | 0.90 | 0.73 |
| EX77 | 0.04 | 0.05 | 0.07 | 0.10 | 0.15 | 0.17 | 0.34 | 0.53 | 0.83 | 0.98 | 0.86 | 0.65 |
| EX78 | 0.08 | 0.10 | 0.14 | 0.19 | 0.21 | 0.41 | 0.59 | 0.69 | 0.76 | 0.79 | 0.78 | 0.73 |
| EX79 | 0.08 | 0.10 | 0.14 | 0.19 | 0.22 | 0.37 | 0.59 | 0.70 | 0.77 | 0.79 | 0.77 | 0.72 |
| EX80 | 0.13 | 0.18 | 0.23 | 0.32 | 0.38 | 0.62 | 0.53 | 0.81 | 0.76 | 0.70 | 0.65 | 0.60 |
| EX81 | 0.09 | 0.12 | 0.15 | 0.24 | 0.23 | 0.36 | 0.71 | 0.80 | 0.82 | 0.79 | 0.75 | 0.67 |

TABLE 25

Test Results on MF-2

| | α | | | | | | | | | | | |
|---|---|---|---|---|---|---|---|---|---|---|---|---|
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| CE25 | 0.04 | 0.04 | 0.05 | 0.06 | 0.08 | 0.10 | 0.14 | 0.19 | 0.26 | 0.36 | 0.48 | 0.61 |
| CE26 | 0.06 | 0.05 | 0.04 | 0.05 | 0.07 | 0.10 | 0.14 | 0.20 | 0.29 | 0.41 | 0.54 | 0.66 |
| EX82 | 0.03 | 0.04 | 0.07 | 0.12 | 0.17 | 0.23 | 0.33 | 0.53 | 0.71 | 0.89 | 0.99 | 0.97 |

TABLE 25-continued

Test Results on MF-2

| | α | | | | | | | | | | | |
|---|---|---|---|---|---|---|---|---|---|---|---|---|
| | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
| EX83 | 0.03 | 0.05 | 0.08 | 0.14 | 0.20 | 0.30 | 0.40 | 0.61 | 0.78 | 0.94 | 0.98 | 0.91 |
| EX84 | 0.05 | 0.07 | 0.10 | 0.16 | 0.19 | 0.27 | 0.45 | 0.61 | 0.76 | 0.91 | 0.97 | 0.94 |
| EX85 | 0.03 | 0.05 | 0.10 | 0.17 | 0.24 | 0.33 | 0.51 | 0.71 | 0.83 | 0.92 | 0.90 | 0.82 |
| EX86 | 0.05 | 0.04 | 0.05 | 0.14 | 0.99 | 0.55 | 1.00 | 0.26 | 0.13 | 0.28 | 0.07 | 0.13 |
| EX87 | 0.02 | 0.04 | 0.05 | 0.23 | 0.86 | 0.86 | 0.74 | 0.23 | 0.13 | 0.19 | 0.08 | 0.08 |
| EX88 | 0.02 | 0.07 | 0.10 | 0.22 | 0.36 | 0.36 | 0.45 | 0.78 | 0.80 | 0.84 | 0.83 | 0.78 |
| EX89 | 0.01 | 0.07 | 0.10 | 0.22 | 0.35 | 0.42 | 0.42 | 0.79 | 0.80 | 0.83 | 0.81 | 0.75 |
| EX90 | 0.05 | 0.03 | 0.06 | 0.33 | 0.84 | 0.48 | 0.49 | 0.50 | 0.31 | 0.25 | 0.20 | 0.17 |
| EX91 | 0.05 | 0.03 | 0.06 | 0.37 | 0.86 | 0.57 | 0.66 | 0.30 | 0.17 | 0.21 | 0.08 | 0.14 |
| EX92 | 0.01 | 0.08 | 0.13 | 0.75 | 0.48 | 0.39 | 0.66 | 0.31 | 0.33 | 0.25 | 0.16 | 0.13 |
| EX93 | 0.03 | 0.07 | 0.25 | 0.11 | 0.28 | 0.81 | 0.78 | 0.58 | 0.53 | 0.45 | 0.38 | 0.24 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An acoustic article comprising:

a porous layer that is a melt-blown non-woven fibrous layer having a plurality of fibers having a median fiber diameter of from 0.1 micrometers to 10 micrometers, wherein the porous article has an overall thickness of from 1 millimeter to 100 millimeters; and heterogeneous filler received in the porous layer, wherein the heterogeneous filler has a median particle size of from 1 micrometer to 100 micrometers and a specific surface area of from 0.1 $m^2/g$ to 100 $m^2/g$, wherein the heterogeneous filler comprises particles dispersed within the fibers of the non-woven fibrous layer and substantially decoupled from each other within the fibers of the non-woven fibrous layer, and wherein the acoustic article has a flow resistance of from 100 MKS Rayls to 8000 MKS Rayls.

2. An acoustic article comprising:

a porous layer that is a melt-blown non-woven fibrous layer having a plurality of fibers having a median fiber diameter of from 0.1 micrometers to 10 micrometers, wherein the porous article has an overall thickness of from 1 millimeter to 100 millimeters; and heterogeneous filler received in the porous layer, wherein the heterogeneous filler has a median particle size of from 100 micrometers to 800 micrometers and a specific surface area of from 100 $m^2/g$ to 800 $m^2/g$, wherein the heterogeneous filler comprises particles dispersed within the fibers of the non-woven fibrous layer and substantially decoupled from each other within the fibers of the non-woven fibrous layer, and wherein the acoustic article has a flow resistance of from 100 MKS Rayls to 8000 MKS Rayls.

3. An acoustic article comprising:

a porous layer that is a melt-blown non-woven fibrous layer having a plurality of fibers having a median fiber diameter of from 0.1 micrometers to 10 micrometers, wherein the porous article has an overall thickness of from 1 millimeter to 100 millimeters; and heterogeneous filler received in the porous layer, wherein the heterogeneous filler has a median particle size of from 100 micrometers to 1000 micrometers and a specific surface area of from 1 $m^2/g$ to 100 $m^2/g$, wherein the heterogeneous filler comprises particles dispersed within the fibers of the non-woven fibrous layer and substantially decoupled from each other within the fibers of the non-woven fibrous layer, and wherein the acoustic article has a flow resistance of from 100 MKS Rayls to 8000 MKS Rayls.

4. The acoustic article of claim 1, wherein the heterogeneous filler comprises a non-layered silicate, and wherein the non-layered silicate is an alkali silicate, alkaline earth silicate, non-zeolitic aluminosilicate, or geopolymer.

5. The acoustic article of claim 1, wherein the heterogeneous filler comprises graphite, and wherein the graphite is unexpanded graphite.

6. The acoustic article of claim 1, wherein the heterogeneous filler comprises a porous polymer filler, and wherein the porous polymer filler comprises a polyolefin foam, polyvinylpyrrolidone, divinylbenzene, divinylbenzene-maleic anhydride, styrene-divinylbenzene or polyacrylate.

7. The acoustic article of claim 1, wherein the heterogeneous filler is agglomerated.

8. The acoustic article of claim 1, wherein the heterogeneous filler has a Dv50/Dv90 particle size ratio of from 0.25 to 1.

9. The acoustic article of claim 2, wherein the heterogeneous filler comprises a non-layered silicate, and wherein the non-layered silicate is an alkali silicate, alkaline earth silicate, non-zeolitic aluminosilicate, or geopolymer.

10. The acoustic article of claim 3, wherein the heterogeneous filler comprises a non-layered silicate, and wherein the non-layered silicate is an alkali silicate, alkaline earth silicate, non-zeolitic aluminosilicate, or geopolymer.

11. The acoustic article of claim 1, wherein the heterogeneous filler has an average interparticle spacing of from 100 micrometers to 1000 micrometers.

12. The acoustic article of claim 1, wherein the porous layer filled with the heterogeneous has a solidity of from 10 percent to 30 percent.

13. The acoustic article of claim 1, wherein the heterogeneous filler has an open-cell structure.

14. The acoustic article of claim 2, wherein the heterogeneous filler has an average interparticle spacing of from 100 micrometers to 1000 micrometers.

15. The acoustic article of claim 2, wherein the porous layer filled with the heterogeneous has a solidity of from 10 percent to 30 percent.

16. The acoustic article of claim 2, wherein the heterogeneous filler has an open-cell structure.

17. The acoustic article of claim 3, wherein the heterogeneous filler has an average interparticle spacing of from 100 micrometers to 1000 micrometers.

18. The acoustic article of claim 3, wherein the porous layer filled with the heterogeneous has a solidity of from 10 percent to 30 percent.

19. The acoustic article of claim 3, wherein the heterogeneous filler has an open-cell structure.

* * * * *